(12) United States Patent
Dhawan et al.

(10) Patent No.: US 11,359,291 B2
(45) Date of Patent: Jun. 14, 2022

(54) USE OF MULTIPLE CHARGED CATIONIC COMPOUNDS DERIVED FROM POLYAMINES AND COMPOSITIONS THEREOF FOR CORROSION INHIBITION IN A WATER SYSTEM

(71) Applicant: ECOLAB USA INC., Saint Paul, MN (US)

(72) Inventors: Ashish Dhawan, Saint Paul, MN (US); Jeremy Moloney, Saint Paul, MN (US); Carter M. Silvernail, Saint Paul, MN (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

(21) Appl. No.: 16/554,972

(22) Filed: Aug. 29, 2019

(65) Prior Publication Data

US 2020/0332423 A1    Oct. 22, 2020

Related U.S. Application Data

(60) Provisional application No. 62/834,627, filed on Apr. 16, 2019.

(51) Int. Cl.
*C23F 11/14* (2006.01)
*C02F 5/12* (2006.01)
(Continued)

(52) U.S. Cl.
CPC .............. *C23F 11/141* (2013.01); *C02F 5/12* (2013.01); *C23F 11/10* (2013.01); *C23F 11/173* (2013.01);
(Continued)

(58) Field of Classification Search
None
See application file for complete search history.

(56) References Cited

U.S. PATENT DOCUMENTS 3,793,194 A * 2/1974 Zecher .................... C02F 5/125
                                                    210/697
3,794,586 A * 2/1974 Kimura ................ C10M 133/52
                                                    508/259
(Continued)

FOREIGN PATENT DOCUMENTS

CN        1340031 A      3/2002
CN      101972612 A      2/2011
(Continued)

OTHER PUBLICATIONS

Somerscales, Euan F.C., "Fundamentals of Corrosion Fouling", Experimental Thermal and Fluid Science, vol. 14, pp. 335-355, 1997.

(Continued)

*Primary Examiner* — Katie L. Hammer
(74) *Attorney, Agent, or Firm* — McKee, Voorhees & Sease PLC

(57) ABSTRACT

Disclosed here are the methods of using one or more multiple charged cationic compounds in a corrosion control composition to reduce corrosion of metal surfaces in a water system. The multiple charged cationic compounds are derived from polyamines through a ring-opening reaction with an epoxide or two reactions: an aza-Michael addition with an activated olefin having a cation group and a ring-opening reaction with an epoxide. The disclosed methods or compositions are found to be effective than those methods or compositions including commonly used corrosion inhibitors for water systems.

24 Claims, 5 Drawing Sheets

(51) Int. Cl.
*C23F 11/10* (2006.01)
*C23F 11/173* (2006.01)
*C09K 8/54* (2006.01)
*C02F 103/02* (2006.01)

(52) U.S. Cl.
CPC .... *C02F 2103/023* (2013.01); *C02F 2303/08* (2013.01); *C09K 8/54* (2013.01); *C09K 2208/32* (2013.01)

(56) References Cited

U.S. PATENT DOCUMENTS

| | | | |
|---|---|---|---|
| 4,259,217 | A | 3/1981 | Murphy |
| 4,355,071 | A | 10/1982 | Chang |
| 4,650,000 | A * | 3/1987 | Andreasson .............. C09K 8/74 166/307 |
| 4,692,315 | A * | 9/1987 | Greaves .................. C23F 11/08 422/18 |
| 4,705,665 | A | 11/1987 | Malik |
| 4,784,797 | A * | 11/1988 | Treybig .................... C09K 8/54 106/14.13 |
| 5,053,150 | A * | 10/1991 | Emert ................... C10M 159/12 508/225 |
| 5,192,798 | A | 3/1993 | Aiken et al. |
| 5,399,746 | A | 3/1995 | Steiger et al. |
| 5,462,714 | A | 10/1995 | Talwalker et al. |
| 5,614,616 | A | 3/1997 | Buysch et al. |
| 5,670,464 | A * | 9/1997 | Kita ..................... C10M 163/00 508/562 |
| 5,738,795 | A | 4/1998 | Chen |
| 6,004,466 | A | 12/1999 | Derian et al. |
| 6,054,054 | A | 4/2000 | Robertson et al. |
| 6,080,323 | A | 6/2000 | Yu et al. |
| 6,090,754 | A | 7/2000 | Chan et al. |
| 6,503,880 | B1 | 1/2003 | Skold et al. |
| 6,797,785 | B1 | 9/2004 | Hund et al. |
| 6,881,710 | B1 | 4/2005 | O'Lenick, Jr. et al. |
| 7,052,614 | B2 | 5/2006 | Barak |
| 7,084,129 | B1 | 8/2006 | Smith et al. |
| 7,345,015 | B1 | 3/2008 | Kong et al. |
| 7,507,399 | B1 | 3/2009 | O'Lenick, Jr. |
| 7,604,978 | B2 | 10/2009 | Eldridge |
| 8,324,264 | B1 | 12/2012 | Eldridge et al. |
| 8,933,055 | B2 | 1/2015 | Pedersen et al. |
| 9,388,361 | B2 | 7/2016 | Terada et al. |
| 9,956,153 | B2 | 5/2018 | Emiru et al. |
| 10,850,999 | B2 | 12/2020 | DiMascio et al. |
| 10,945,431 | B2 | 3/2021 | Karandikar et al. |
| 2001/0044393 | A1 | 11/2001 | Peterson, Jr. et al. |
| 2002/0155978 | A1 | 10/2002 | Man et al. |
| 2003/0121532 | A1 | 7/2003 | Coughlin et al. |
| 2005/0215461 | A1 | 9/2005 | Gluck et al. |
| 2006/0008496 | A1 | 1/2006 | Kulkarni et al. |
| 2006/0289164 | A1 | 12/2006 | Smith et al. |
| 2006/0289359 | A1 | 12/2006 | Manek et al. |
| 2008/0152567 | A1 | 6/2008 | Killough |
| 2010/0004316 | A1 | 1/2010 | Lu et al. |
| 2010/0029530 | A1 | 2/2010 | Whiteley |
| 2010/0305014 | A1 | 12/2010 | Miralles et al. |
| 2010/0331234 | A1 | 12/2010 | Mahon et al. |
| 2011/0112007 | A1 | 5/2011 | Hodge et al. |
| 2012/0053111 | A1 | 3/2012 | Hodge et al. |
| 2012/0070341 | A1 | 3/2012 | Eder et al. |
| 2012/0115962 | A1 | 5/2012 | Lee et al. |
| 2012/0258157 | A1 | 10/2012 | Koltzenburg et al. |
| 2013/0266669 | A1 | 10/2013 | Jiang et al. |
| 2014/0124454 | A1 | 5/2014 | Nichols et al. |
| 2014/0224733 | A1 | 8/2014 | Osness et al. |
| 2015/0203738 | A1 | 7/2015 | Witham et al. |
| 2015/0290100 | A1 | 10/2015 | Eder et al. |
| 2016/0010035 | A1 | 1/2016 | Liu et al. |
| 2016/0030315 | A1 | 2/2016 | Emiru et al. |
| 2016/0145610 | A1 | 5/2016 | Lu et al. |
| 2016/0262999 | A1 | 9/2016 | Pedersen et al. |
| 2016/0264734 | A1 | 9/2016 | Boday et al. |
| 2016/0264744 | A1 | 9/2016 | Boday et al. |
| 2017/0029691 | A1 * | 2/2017 | Faust, Jr ............... C09K 8/524 |
| 2017/0121560 | A1 | 5/2017 | Dockery et al. |
| 2017/0233643 | A1 | 8/2017 | Agashe et al. |
| 2017/0349543 | A1 | 12/2017 | Siegwart et al. |
| 2017/0360040 | A1 | 12/2017 | Kost et al. |
| 2018/0007895 | A1 | 1/2018 | Karandikar et al. |
| 2018/0066211 | A1 | 3/2018 | Pickering et al. |
| 2018/0105629 | A1 | 4/2018 | Tada et al. |
| 2018/0118999 | A1 | 5/2018 | Hikem et al. |
| 2018/0163020 | A1 | 6/2018 | Zong et al. |
| 2019/0062187 | A1 | 2/2019 | Dhawan et al. |
| 2019/0223434 | A1 | 7/2019 | Balasubramanian et al. |
| 2019/0224627 | A1 | 7/2019 | Glanz et al. |
| 2020/0071205 | A1 | 3/2020 | Dhawan et al. |
| 2020/0071261 | A1 | 3/2020 | Dhawan et al. |
| 2020/0332423 | A1 | 10/2020 | Dhawan et al. |

FOREIGN PATENT DOCUMENTS

| | | |
|---|---|---|
| CN | 102504247 A | 6/2012 |
| CN | 102675535 A | 9/2012 |
| CN | 103288672 A | 9/2013 |
| CN | 102675535 B | 11/2013 |
| CN | 104130335 A | 11/2014 |
| CN | 104130351 A | 11/2014 |
| CN | 104744709 A | 7/2015 |
| CN | 105076201 A | 11/2015 |
| CN | 105523956 A | 4/2016 |
| CN | 106172434 A | 12/2016 |
| CN | 106423269 A | 2/2017 |
| CN | 106423284 A | 2/2017 |
| CN | 106634929 A | 5/2017 |
| CN | 106946743 A | 7/2017 |
| CN | 107440935 A | 12/2017 |
| CN | 108033895 A | 5/2018 |
| CN | 108048249 A | 5/2018 |
| CN | 108938662 A | 12/2018 |
| EP | 0296441 A2 | 12/1988 |
| GB | 847321 | 9/1960 |
| GB | 1550420 A | 8/1979 |
| JP | 6116351 A | 4/1994 |
| JP | 6116898 A | 4/1994 |
| JP | 2001187751 A | 7/2001 |
| JP | 200777082 A | 3/2007 |
| JP | 2007054710 A | 3/2007 |
| JP | 2007256445 A | 10/2007 |
| JP | 2012136504 A | 7/2012 |
| JP | 2014009177 A | 1/2014 |
| JP | 2014093768 A | 5/2014 |
| JP | 2014221859 A | 11/2014 |
| WO | 2004056843 A2 | 7/2004 |
| WO | 2012083497 A1 | 6/2012 |
| WO | 2013087287 A1 | 6/2013 |
| WO | 2014079621 A1 | 5/2014 |
| WO | 2015084304 A1 | 6/2015 |
| WO | 2016205513 A1 | 12/2016 |
| WO | 2017003639 A2 | 1/2017 |
| WO | 2017201076 A1 | 11/2017 |
| WO | 2018112548 A1 | 6/2018 |
| WO | 2019046409 A1 | 3/2019 |

OTHER PUBLICATIONS

Fan et al., "Synthesis and Aggregation Behavior of a Hexameric Quaternary Ammonium Surfactant", Langmuir, vol. 27, pp. 10570-10579, Jul. 28, 2011.

Kawakami et al., "Antibacterial Activity of Radial Compounds with Peripheral Quaternary Ammonium Units", Transactions of the Materials Research Society of Japan, vol. 35[4], pp. 885-887, 2010.

Zhang et al., "PAMAM-Based Dendrimers with Different Alkyl Chains Self-Assemble on Silica Surfaces: Controllable Layer Structure and Molecular Aggregation", J. Phys. Chem. B, vol. 122, pp. 6648-6655, Jun. 13, 2018.

Zhou et al., "Cooperative binding and self-assembling behavior of cationic low molecular-weight dendrons with RNA molecules", Organic & Biomolecular Chemistry, vol. 4, pp. 581-585, 2006.

(56) References Cited

OTHER PUBLICATIONS

Brycki et al., "The biodegradation of monomeric and dimeric alkylammonium surfactants", Journal of Hazardous Materials, vol. 280, pp. 797-815, Aug. 6, 2014.
Gan et al., "Sugar-Based Ester Quaternary Ammonium Compounds and Their Surfactant Properties", Journal of Surfactants and Detergents, vol. 17, Issue 3, pp. 465-470, Jan. 3, 2014.
Negm et al., "Synthesis, Characterization and Biological Activity of Sugar-Based Gemini Cationic Amphiphiles", Journal of Surfactants and Detergents, vol. 11, Issue 3, pp. 215-221, Apr. 26, 2008.
Tan et al., "The use of quaternised chitosan-loaded PMMA to inhibit biofilm formation and downregulate the virulence-associated gene expression of antibiotic-resistant *staphylococcus*", Biomaterials, vol. 33, Issue 2, pp. 365-377, Jan. 2012.
Zaky, Mohamad, "Biocidal Activities of Cationic Surface Active Starch and Its Transition Metal Complexes Against Different Bacterial Strains", Journal of Surfactants and Detergents, vol. 13, Issue 3, pp. 255-260, Jul. 2010.
Zhi et al., "Self-aggregation and antimicrobial activity of saccharide-cationic surfactants", Colloids and Surfaces A: Physicochemical and Engineering Aspects, vol. 456, pp. 231-237, Aug. 2014.
Labade et al., "Cesium fluoride catalyzed Aza-Michael addition reaction in aqueous media", Monatsh Chem., vol. 142, pp. 1055-1059, Jul. 19, 2011.
ECOLAB USA Inc., in connection with PCT/US2019/048689 filed Aug. 29, 2019, "International Search Report and the Written Opinion of the International Searching Authority, or the Declaration", 12 pages, dated Jan. 20, 2020.
"Azamethonium", http://pubchem.ncbi.nlm.nih.gov/compound/9383, last modified Oct. 6, 2018 and accessed by Applicant Oct. 11, 2018.
Zhang et al., "Controllable Self-Assembly of Amphiphilic Dendrimers on a Silica Surface: The Effect of Molecular Topological Structure and Salinity", The Journal of Physical Chemistry, vol. 8, pp. 10990-10999, Oct. 5, 2016.
Zhang et al., "Supporting Information—Controllable Self-Assembly of Amphiphilic Dendrimers at Silica Surface: Effect of Molecular Topological Structure and Salinity", Beijing National Laboratory for Molecular Sciences, 4 pages, Oct. 5, 2016.
Zielinski et al., "Synthesis of new quaternary ammonium salts for organophilization of fillers for polymeric nanocomposites", www.miesiecznikchemik.pl, 2007.
Bi et al., "Dendrimer-Based Demulsifiers for Polymer Flooding Oil-in-Water Emulsions", Energy Fuels, vol. 31. No. 5, pp. 5395-5401, Apr. 20, 2017.
Kramer et al., "Dendritic polyamines: simple access to new materials with defined treelike structures for application in nonviral gene delivery", Chembiochem, vol. 5(8), pp. 1081-1087, Aug. 6, 2004.
Miller et al., "Non-viral CRISPR/Cas gene editing in vitro and in vivo enabled by synthetic nanoparticle co-delivery of Cas9 mRNA and sgRNA", Angew Chem Int Ed Engl., vol. 56(4), pp. 1059-1063, Jan. 19, 2017.
Ning et al., "Synthesis and characterization of a novel non-polyether demulsifier", Chemical Engineer, 3 pages, 2013.
Wang et al., "A novel environment-sensitive biodegradable polydisulfide with protonatable pendants for nucleic acid delivery", Journal of Controlled Release, vol. 120, pp. 250-258, May 11, 2007.
International Preliminary Examining Authority in connection with PCT/US2019/048689 filed Aug. 29, 2019, "Written Opinion of the International Preliminary Examining Authority", 5 pages, dated Jul. 2, 2020.
Zielinksi, Wojciech et al., "TI—Synthesis of new quaternary ammonium salts for organophilization of fillers for polymeric nanocomposites", D1: Database Chemical Abstracts [Online] chemical abstracts; XP55789968, Database accession No. 2007:1236240 Jan. 1, 2007.
Bosica et al., "Aza-Michael Mono-addition Using Acidic Alumina under Solventless Conditions", Molecules, vol. 21, 11 pages, Jun. 22, 2016.
Mann et al., "Acetal initiated cyclization of allylsilanes to highly functionalized piperidine derivatives", Tetraedron Letters, vol. 29(26), pp. 3247-3250, 1988.
Registry 790647-93-7, accessed online on Aug. 14, 2021, 1 page, registered Nov. 30, 2004.
Registry 881538-24-5, accessed online on Aug. 14, 2021, 1 page, registered Apr. 21, 2006.
Registry 881538-25-6, accessed online on Aug. 14, 2021, 1 page, registered Apr. 21, 2006.
Registry 881538-26-7, accessed online on Aug. 14, 2021, 1 page, registered Apr. 21, 2006.
Registry 930395-29-2, accessed online on Aug. 14, 2021, 1 page, registered Apr. 17, 2007.
Registry 951236-20-7, accessed online on Aug. 14, 2021, 1 page, registered Oct. 23, 2007.
Registry 951236-22-9, accessed online on Aug. 14, 2021, 1 page, registered Oct. 23, 2007.
Registry 951236-51-4, accessed online on Aug. 14, 2021, 1 page, registered Oct. 23, 2007.
Registry 1025555-14-9, accessed online on Aug. 14, 2021, 1 page, registered Jun. 5, 2008.
Registry 1025555-15-0, accessed online on Aug. 14, 2021, 1 page, registered Jun. 5, 2008.
Registry 1346596-75-5, accessed online on Aug. 14, 2021, 1 page, registered Nov. 30, 2011.
Registry 1346596-76-6, accessed online on Aug. 14, 2021, 1 page, registered Nov. 30, 2011.
Registry 1346596-77-7, accessed online on Aug. 14, 2021, 1 page, registered Nov. 30, 2011.
Registry 1801234-01-4, accessed online on Aug. 14, 2021, 1 page, registered Aug. 3, 2015.
Registry 1801234-02-5, accessed online on Aug. 14, 2021, 1 page, registered Aug. 3, 2015.
Registry 2000293-27-4, accessed online on Aug. 14, 2021, 1 page, registered Sep. 26, 2016.
Registry 2001056-21-7, accessed online on Aug. 14, 2021, 1 page, registered Sep. 27, 2016.
Twyman, Lance J., "Post synthetic modification of the hydrophobic interior of a water-soluble dendrimer", Tetrahedron Letters, vol. 41(35), pp. 6875-6878, 2000.

* cited by examiner

Step-1

Step-2

Wherein

R' =

USE OF MULTIPLE CHARGED CATIONIC COMPOUNDS DERIVED FROM POLYAMINES AND COMPOSITIONS THEREOF FOR CORROSION INHIBITION IN A WATER SYSTEM

CROSS-REFERENCE TO RELATED APPLICATIONS

This application claims priority under 35 U.S.C. § 119 to provisional application Ser. No. 62/834,627, filed Apr. 16, 2019 herein incorporated by reference in its entirety.

FIELD OF THE INVENTION

The present disclosure relates generally to the field of corrosion control in a water system, especially upstream oil and gas production fluids, using one or more multiple charged compounds derived from polyamines. In particular, the present disclosure relates to using a corrosion control composition comprising one or more modified polyamines that comprise one or more nonionic groups or both cationic and nonionic groups attached to its nitrogen atoms in a water system, especially in a water system for oil and gas operation. The methods and corrosion control compositions disclosed herein are effective to prevent corrosion in a water system.

BACKGROUND OF THE INVENTION

A water system, including an industrial water system in oil and gas operation, serves many different purposes. Any water system, including its equipment and water, is prone to microbial contamination and fouling. Metal surfaces in any water system are prone to corrosion, partly due to microbial contamination and fouling.

Corrosion inhibitors are often added into a water system to protect its metal surface infrastructure, such as carbon steel pipelines, from corrosion. As an example, corrosion inhibitors are often added into upstream oil and gas production fluids to protect carbon steel pipelines and infrastructure from corrosion. Quaternary ammonium compounds have been used for many years as corrosion inhibitors and fouling control agents for a water system.

Quaternary ammonium compounds belong to an important subcategory of surfactants because they have unique properties. A main distinction between quaternary ammonium compounds from other surfactants is their unique structures. Quaternary ammonium compounds consist mainly of two moieties, a hydrophobic group, e.g., long alkyl group, and a quaternary ammonium salt group. The unique positive charge of the ammonium plays a key role, e.g., electrostatic interactions, between the surfactant and surface or different components of biofilms.

However, the quaternary ammonium compounds used for such purpose are often bis quaternary species or species quaternized with benzyl chloride that are known to be very hazardous. In additional, governmental regulations exist to release any water containing single quaternary compounds into environment. Therefore, there is a continuing need for different or alternative quaternary ammonium compounds that are better and safer corrosion control agents.

Accordingly, it is an objective of the present disclosure to develop novel corrosion control agents having improved corrosion control properties.

It is a further objective of the disclosure to develop methods and corrosion control compositions to make corrosion control in a water system more efficient and effective.

These and other objects, advantages and features of the present disclosure will become apparent from the following specification taken in conjunction with the claims set forth herein.

BRIEF SUMMARY OF THE INVENTION

Disclosed herein are the methods and compositions for corrosion control for a metal surface in a water system. Specifically, the disclosed methods and compositions for corrosion control for a metal surface in a water system use one or more multiple charged cationic compounds comprising one or more nonionic groups or one or more positive charged groups and nonionic groups within single molecule of various sizes. They are derived from water soluble polyamine or polyethyleneimines.

The exemplary multiple charged cationic compounds comprising one or more nonionic groups or one or more positive charged groups and one or more nonionic groups disclosed herein show their effectiveness for controlling corrosion on a metal surface. In a related application filed simultaneously herewith, U.S. patenat application Ser. No. 16/554,415 claiming priority under 35 U.S.C. § 119 to provisional application 62/724,357, filed on Aug. 29, 2018 and titled "MULTIPLE CHARGED IONIC COMPOUNDS DERIVED FROM POLYAMINES AND COMPOSITIONS THEREOF AND METHODS OF PREPARATION THEREOF", the preparation of some of these multiple charged cationic compounds comprising multiple positive charged groups and one or more nonionic groups were described, and the entire contents of these applications are incorporated herein by reference in their entirety.

In one aspect, disclosed herein is a method for controlling corrosion in a water system, wherein the method comprises providing a corrosion control composition or a use solution of the corrosion control composition into a water system to generate a treated water system or onto a metal surface of the water system, wherein the corrosion control composition comprises one or more multiple charged cationic compounds; wherein the multiple charged cationic compounds are derived from a polyamine through its reactions with an epoxide or an activated olefin and an epoxide, wherein the activated olefin has the following formula;

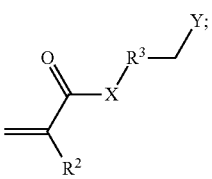

wherein X is NH or O; $R^2$ is H, $CH_3$, or an unsubstituted, linear or branched $C_2$-$C_{10}$ alkyl, alkenyl, or alkynyl group; $R^3$ is absent or an unsubstituted, linear or branched $C_1$-$C_{30}$ alkylene group; Y is $-NR_4R_5R_6^{(+)}$; $R^4$, $R^5$, and $R^6$ are independently a $C_1$-$C_{10}$ alkyl group; wherein the epoxide has the following formula;

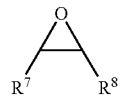

wherein $R^7$ is H or alkyl; and $R^8$ is alkyl, or —$(CH_2)_k$—O-alkyl, wherein k is an integer of 1-30; wherein the polyamine and activated olefin undergo aza Michael Addition reaction and the polyamine and epoxide undergo ring opening reaction; wherein the compound has 1, 2, 3, or more positive charges from the activated olefin and at least one nonionic group from the epoxide or has at least one nonionic group from the epoxide; and wherein the corrosion control composition reduces corrosion on the metal surface in the water system.

In some embodiments, the multiple charged compound has one of the generic formula of $NA_2$-[—$R^{10'}$]$_n$-$NA_2$, $(RNA)_n$-$RNA_2$, $NA_2$-$(RNA)_n$-$RNA_2$, or $NA_2$-$(RN(R'))_n$-$RNA_2$, wherein $R^{10'}$ is a linear or branched, unsubstituted or substituted $C_2$-$C_{10}$ alkylene group, or combination thereof; R is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkylene group, or combination thereof; R' is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkyl group, $RNA_2$, $RNARNA_2$, or $RN(RNA_2)_2$; n can be from 2 to 1,000,000; A is a proton,

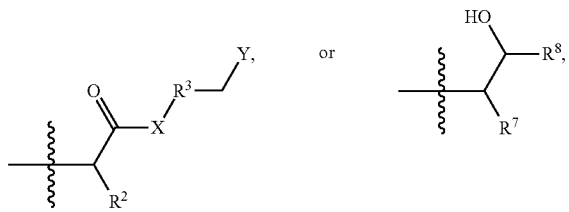

or A is a proton or

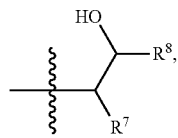

wherein X is NH or O; $R^2$ is H, $CH_3$, or an unsubstituted, linear or branched $C_2$-$C_{10}$ alkyl, alkenyl, or alkynyl group; $R^3$ is absent or an unsubstituted, linear or branched $C_1$-$C_{30}$ alkylene group; Y is —$NR_4R_5R_6^{(+)}$, $R^4$, $R^5$, and $R^6$ are independently a $C_1$-$C_{10}$ alkyl group; $R^7$ is H or alkyl; and $R^8$ is alkyl, or —$(CH_2)_k$—O-alkyl, wherein k is an integer of 1-30; wherein the compound is a multiple charged cationic compound having 1, 2, 3, or more

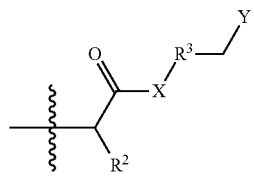

groups and at least one

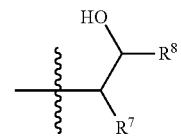

group or having at least one

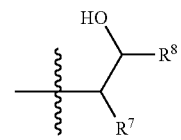

group.

In another aspect, disclosed herein is a corrosion control composition for a water system, wherein the composition mitigates corrosion on a metal surface in a water system and comprises one or more multiple charged cationic compounds as disclosed herein and one or more corrosion control composition agents.

The corrosion control compositions and methods disclosed herein have a surprising advantage of not only preventing corrosion of metal surfaces in a water system but also preventing microbial/biofilm growth, leading to overall reduction in chemical uses, cost, and operation complexity for operating a water system. In some embodiments, the corrosion control composition or methods disclosed herein are free of other corrosion inhibitors and/or fouling control agents.

The forgoing summary is illustrative only and is not intended to be in any way limiting. In addition to the illustrative aspects, embodiments and features described above, further aspects, embodiments, and features of the present technology will become apparent to those skilled in the art from the following drawings and the detailed description, which shows and describes illustrative embodiments of the present technology. Accordingly, the figures and detailed description are also to be regarded as illustrative in nature and not in any way limiting.

Figure 1:
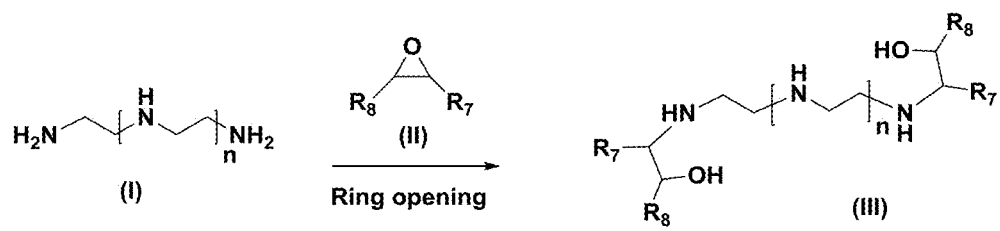
FIG. 1 shows an exemplary generic reaction scheme to produce a multiple charged cationic compound first by a ring-opening reaction between a linear polyethyleneimine and epoxide and then an aza-Michael addition reaction with an activated olefin (α, β-unsaturated carbonyl compound).
Figure 1:
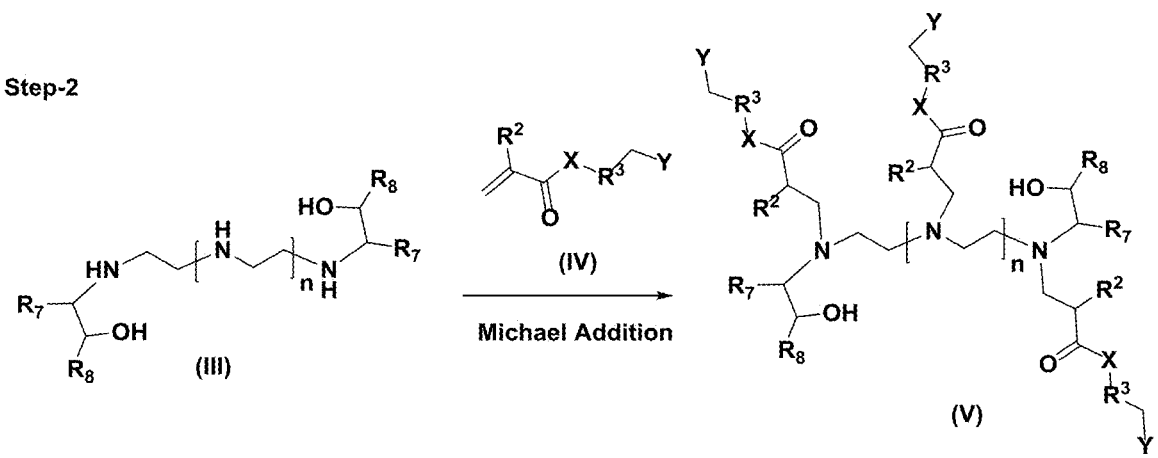

Various embodiments of the present disclosure will be described in detail with reference to the drawings, wherein like reference numerals represent like parts throughout the several views. Reference to various embodiments does not limit the scope of the disclosure. Figures represented herein are not limitations to the various embodiments according to the disclosure and are presented for exemplary illustration of the disclosure.

DETAILED DESCRIPTION OF THE PREFERRED EMBODIMENT

In the following detailed description, reference may made to the accompanying drawings, schemes, and structures which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

Disclosed herein are methods and composition for corrosion control for a metal surface in a water system. More particularly, one or more multiple charged cationic compounds comprising multiple positive charges and one or more nonionic groups are used in corrosion control compositions or methods disclosed herein. These specific multiple charged cationic compounds can be derived from various polyamines.

The embodiments of this disclosure are not limited to particular compositions and methods of use which can vary and are understood by skilled artisans. It is further to be understood that all terminology used herein is for the purpose of describing particular embodiments only and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers within the defined range. Throughout this disclosure, various aspects of this disclosure are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the present disclosure may be more readily understood, certain terms are first defined. Unless defined otherwise, all technical and scientific terms used herein have the same meaning as commonly understood by one of ordinary skill in the art to which embodiments of the disclosure pertain. Many methods and materials similar, modified, or equivalent to those described herein can be used in the practice of the embodiments of the present disclosure without undue experimentation, the preferred materials and methods are described herein. In describing and claiming the embodiments of the present disclosure, the following terminology will be used in accordance with the definitions set out below.

The term "about," as used herein, refers to variation in the numerical quantity that can occur, for example, through typical measuring and liquid handling procedures used for making concentrates or use solutions in the real world; through error in these procedures; through differences in the manufacture, source, or purity of the ingredients used to make the compositions or carry out the methods; and the like. The term "about" also encompasses amounts that differ due to novel equilibrium conditions for a composition resulting from a particular initial mixture. Whether or not modified by the term "about", the claims include equivalents to the quantities.

As used herein, "substituted" refers to an organic group as defined below (e.g., an alkyl group) in which one or more bonds to a hydrogen atom contained therein are replaced by a bond to non-hydrogen or non-carbon atoms. Substituted groups also include groups in which one or more bonds to carbon(s) or hydrogen(s) atom replaced by one or more bonds, including double or triple bonds, to a heteroatom. Thus, a substituted group is substituted with one or more substituents, unless otherwise specified. A substituted group can be substituted with 1, 2, 3, 4, 5, or 6 substituents.

Substituted ring groups include rings and ring systems in which a bond to a hydrogen atom is replaced with a bond to a carbon atom. Therefore, substituted cycloalkyl, aryl, heterocyclyl, and heteroaryl groups may also be substituted with substituted or unsubstituted alkyl, alkenyl, and alkynyl groups are defined herein.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

Alkenyl groups or alkenes are straight chain, branched, or cyclic alkyl groups having two to about 30 carbon atoms, and further including at least one double bond. In some embodiments, an alkenyl group has from 2 to about 30 carbon atoms, or typically, from 2 to 10 carbon atoms. Alkenyl groups may be substituted or unsubstituted. For a double bond in an alkenyl group, the configuration for the double bond can be a trans or cis configuration. Alkenyl groups may be substituted similarly to alkyl groups.

Alkynyl groups are straight chain, branched, or cyclic alkyl groups having two to about 30 carbon atoms, and further including at least one triple bond. In some embodiments, an alkynyl group has from 2 to about 30 carbon atoms, or typically, from 2 to 10 carbon atoms. Alkynyl groups may be substituted or unsubstituted. Alkynyl groups may be substituted similarly to alkyl or alkenyl groups.

As used herein, the terms "alkylene", "cycloalkylene", "alkynylides", and "alkenylene", alone or as part of another substituent, refer to a divalent radical derived from an alkyl, cycloalkyl, or alkenyl group, respectively, as exemplified by —$CH_2CH_2CH_2$—. For alkylene, cycloalkylene, alkynylene, and alkenylene groups, no orientation of the linking group is implied.

The term "ester" as used herein refers to —$R^{30}COOR^{31}$ group. $R^{30}$ is absent, a substituted or unsubstituted alkylene, cycloalkylene, alkenylene, alkynylene, arylene, aralkylene, heterocyclylalkylene, or heterocyclylene group as defined herein. $R^{31}$ is a substituted or unsubstituted alkyl, cycloalkyl, alkenyl, alkynyl, aryl, aralkyl, heterocyclylalkyl, or heterocyclyl group as defined herein.

The term "amine" (or "amino") as used herein refers to —$R^{32}NR^{33}R^{34}$ groups. $R^{32}$ is absent, a substituted or unsubstituted alkylene, cycloalkylene, alkenylene, alkynylene, arylene, aralkylene, heterocyclylalkylene, or heterocyclylene group as defined herein. $R^{33}$ and $R^{34}$ are independently hydrogen, or a substituted or unsubstituted alkyl, cycloalkyl, alkenyl, alkynyl, aryl, aralkyl, heterocyclylalkyl, or heterocyclyl group as defined herein.

The term "amine" as used herein also refers to an independent compound. When an amine is a compound, it can be represented by a formula of $R^{32'}NR^{33'}R^{34'}$ groups, wherein $R^{32'}$, $R^{33'}$, and $R^{34'}$ are independently hydrogen, or a substituted or unsubstituted alkyl, cycloalkyl, alkenyl, alkynyl, aryl, aralkyl, heterocyclylalkyl, or heterocyclyl group as defined herein.

The term "alcohol" as used herein refers to —$R^{35}OH$ groups. $R^{35}$ is absent, a substituted or unsubstituted alkylene, cycloalkylene, alkenylene, alkynylene, arylene, aralkylene, heterocyclylalkylene, or heterocyclylene group as defined herein.

The term "carboxylic acid" as used herein refers to —$R^{36}COOH$ groups. $R^{36}$ is absent, a substituted or unsubstituted alkylene, cycloalkylene, alkenylene, alkynylene, arylene, aralkylene, heterocyclylalkylene, or heterocyclylene group as defined herein.

The term "ether" as used herein refers to —$R^{37}OR^{38}$ groups. $R^{37}$ is absent, a substituted or unsubstituted alkylene, cycloalkylene, alkenylene, alkynylene, arylene, aralkylene, heterocyclylalkylene, or heterocyclylene group as defined herein. $R^{38}$ is a substituted or unsubstituted alkyl, cycloalkyl, alkenyl, alkynyl, aryl, aralkyl, heterocyclylalkyl, or heterocyclyl group as defined herein.

The term "solvent" as used herein refers to any inorganic or organic solvent. Solvents are useful in the disclosed method or article, product, or composition as reaction solvent or carrier solvent. Suitable solvents include, but are not limited to, oxygenated solvents such as lower alkanols, lower alkyl ethers, glycols, aryl glycol ethers and lower alkyl glycol ethers. Examples of other solvents include, but are not limited to, methanol, ethanol, propanol, isopropanol and butanol, isobutanol, ethylene glycol, diethylene glycol, triethylene glycol, propylene glycol, dipropylene glycol, mixed ethylene-propylene glycol ethers, ethylene glycol phenyl ether, and propylene glycol phenyl ether. Water is a solvent too. The solvent used herein can be of a single solvent or a mixture of many different solvents.

Glycol ethers include, but are not limited to, diethylene glycol n-butyl ether, diethylene glycol n-propyl ether, diethylene glycol ethyl ether, diethylene glycol methyl ether, diethylene glycol t-butyl ether, dipropylene glycol n-butyl ether, dipropylene glycol methyl ether, dipropylene glycol ethyl ether, dipropylene glycol propyl ether, dipropylene glycol tert-butyl ether, ethylene glycol butyl ether, ethylene glycol propyl ether, ethylene glycol ethyl ether, ethylene glycol methyl ether, ethylene glycol methyl ether acetate, propylene glycol n-butyl ether, propylene glycol ethyl ether, propylene glycol methyl ether, propylene glycol n-propyl ether, tripropylene glycol methyl ether and tripropylene glycol n-butyl ether, ethylene glycol phenyl ether, propylene glycol phenyl ether, and the like, or mixtures thereof.

Alkalinity Source or Base

The disclosed methods of preparation and compositions may include using an effective amount of an alkalinity source or base as a catalyst or ingredient. The alkalinity source or base in turn comprises one or more alkaline compounds. The alkalinity source can be added to the reaction mixture in the form of solid, liquid, or solution thereof.

In general, an effective amount of the alkalinity source should be considered as an amount that provides a reaction mixture having a pH of at least about 8. When the solution has a pH of between about 8 and about 10, it can be considered mildly alkaline, and when the pH is greater than about 12, the solution can be considered caustic.

The alkalinity source can include an alkali metal carbonate, an alkali metal hydroxide, alkaline metal silicate, alkaline metal metasilicate, or a mixture thereof. Suitable metal carbonates that can be used include, for example, sodium or potassium carbonate, bicarbonate, sesquicarbonate, or a mixture thereof. Suitable alkali metal hydroxides that can be used include, for example, sodium, lithium, or potassium hydroxide. Examples of useful alkaline metal silicates include sodium or potassium silicate (with $M_2O:SiO_2$ ratio of 2.4 to 5:1, M representing an alkali metal) or metasilicate. A metasilicate can be made by mixing a hydroxide and silicate. The alkalinity source may also include a metal borate such as sodium or potassium borate, and the like.

The alkalinity source may also include ethanolamines, urea sulfate, amines, amine salts, and quaternary ammonium. The simplest cationic amines, amine salts and quaternary ammonium compounds can be schematically drawn thus:

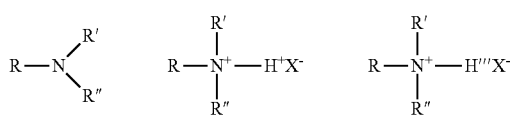

in which, R represents a long alkyl chain, R', R", and R'" may be either long alkyl chains or smaller alkyl or aryl groups or hydrogen and X represents an anion.

In some embodiments, the methods of preparation are free of the alkalinity source because the reactants contain a primary amine or primary amine group to catalyze the reaction. In some embodiments, the compositions disclosed herein are free of the alkalinity source.

Polyamines

A polyamine can have, but is not limited to, a generic formula of $NH_2—[R^{10'}]_n—NH_2$, $(RNH)_n—RNH_2$, $H_2N—(RNH)_n—RNH_2$, or $H_2N—(RN(R'))_n—RNH_2$, wherein $R^{10'}$ is a linear or branched, unsubstituted or substituted $C_2$-$C_{10}$ alkylene group, or combination thereof; R is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkylene group, or combination thereof; R' is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkyl group, $RNH_2$, $RNHRNH_2$, or $RN(RNH_2)_2$; and n can be from 2 to 1,000,000. The monomer in a polyamine, e.g., the R or R' group, can be the same or different. In this disclosure, a polyamine refers to both small molecule polyamine when n is from 1 to 9 and polymeric polyamine when n is from 10 to 1,000,000.

Small molecule polyamines include, but are not limited to ethylenediamine, diethylenetriamine, triethylenetetramine, tetraethylenepentamine, pentaethylenehexamine, hexaethyleneheptamine, and tris(2-aminoethyl)amine.

Other possible polyamines include JEFFAMINE® monoamines, diamines, and triamines by Huntsman. These highly versatile products contain primary amino groups attached to the end of a polyether backbone normally based on propylene oxide (PO), ethylene oxide (EO), or a mixture of both oxides. JEFFAMINE® amines include a polyetheramine family consisted of monoamines, diamines and triamines based on the core polyether backbone structure. JEFFAMINE® amines also include high-conversion, and polytetramethylene glycol (PTMEG) based polyetheramines. These JEFFAMINE® amines have an average molecular weight ($M_w$) of from about 130 to about 4,000.

A polyamine used in this disclosure can be a polyamine derivative or modified polyamine, in which one or more of the NH protons, but not all, in the polyamine is substituted by an unsubstituted or substituted group. For example, an alkyl polyamine that contains one or more alkyl group connected to the nitrogen atom can be used to produce the multiple charge cationic polyamine disclosed herein. In these PEI derivatives, only some of primary $NH_2$ or secondary NH protons are replaced by other non-proton groups and the remaining $NH_2$ or NH protons can still react with a Michael acceptor, such as an activated olefin containing a hydrophilic (ionic) group, by an aza-Michael Addition reaction.

One class of the polymeric polyamine includes polyethyleneimine (PEI) and its derivatives. Polyethyleneimine (PEI) or polyaziridine is a polymer with a repeating unit of $CH_2CH_2NH$ and has a general formulation of $NH_2(CH_2CH_2NH)_n—CH_2CH_2NH_2$, wherein n can be from 2 to $10^5$. The repeating monomer in PEI has a molecular weight ($M_w$) of 43.07 and a nitrogen to carbon ratio of 1:2.

PEI derivatives include ethoxylated/propylated PEIs, polyquats PEI, polyglycerol quats PEI, and other PEI derivatives, salts, or mixtures thereof. The molar mass of the polyethyleneimines, including modified polyethyleneimines can vary from about 800 g/mol to about 2,000,000 g/mol. For Example, SOKALAN® HP20 is an alkoxylated PEI product. In these PEI derivatives, only some of primary $NH_2$ or secondary NH protons are replaced by functional groups and the remaining $NH_2$ or NH protons can still react with a Michael acceptor, e.g., activated olefin or α, β-unsaturated compound containing a hydrophilic (ionic) group.

PEIs and their derivatives can linear, branched, or dendric. Linear polyethyleneimines contain all secondary amines, in contrast to branched PEIs which contain primary, secondary and tertiary amino groups. Totally branched, dendrimeric forms also exist and contain primary and tertiary amino groups. Drawings for unmodified linear, branched, and dendrimeric PEI are shown below.

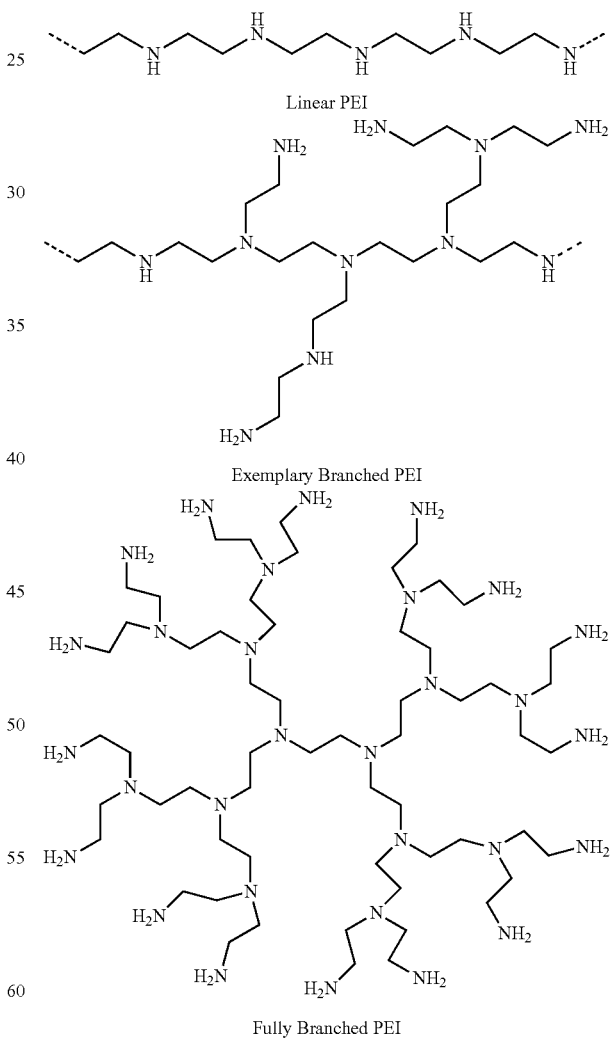

PEI derivatives are usually obtained by substituting proton(s) on the nitrogen atoms with different group. One such PEI derivative is ethoxylated and propoxylated PEI, wherein the polyethyleneimines are derivatized with ethylene oxide (EO) and/or propylene oxide (PO) side chains. Ethoxylation of PEIs can increase the solubility of PEIs.

PEI is produced on industrial scale. Various commercial polyethyleneimines are available, including for example those sold under the tradename Lupasol® (BASF), including for example Lupasol® FG, Lupasol® G, Lupasol® PR 8515, Lupasol® WF, Lupasol® G 20/35/100, Lupasol® HF, Lupasol® P, Lupasol® PS, Lupasol® PO 100, Lupasol® PN 50/60, and Lupasol® SK. These PEIs have average molecular weights ($M_w$) of about 800, about 1,300, about 2,000, about 5,000, about 25,000, about 1,300/2,000/5,000, about 25,000, about 750,000, about 750,000, about 1,000,000, and about 2,000,000, respectively.

Two commonly used averages for molecular weight of a polymer are number average molecular weight ($M_n$) and weight average molecular weight ($M_w$). The polydispersity index (D) represents the molecular weight distribution of the polymers. $M_n = M_w = (\Sigma n_i M_i)/\Sigma n_i$, $M_w = (\Sigma n_i M_i)$, and $D = M_w/M_n$, wherein the index number, i, represents the number of different molecular weights present in the sample and $n_i$ is the total number of moles with the molar mass of $M_i$. For a polymer, $M_n$ and $M_w$ are usually different. For example, a PEI compound can have a $M_n$ of about 10,000 by GPC and $M_w$ of about 25,000 by LS.

Light Scattering (LS) can be used to measure $M_w$ of a polymer sample. Another easy way to measure molecular weight of a sample or product is gel permeation chromatography (GPC). GPC is an analytical technique that separates molecules in polymers by size and provides the molecular weight distribution of a material. GPC is also sometimes known as size exclusion chromatography (SEC). This technique is often used for the analysis of polymers for their both $M_n$ and $M_w$.

These commercially available and exemplary polyethyleneimines are soluble in water and available as anhydrous polyethyleneimines and/or modified polyethyleneimines provided in aqueous solutions or methoxypropanol (as for Lupasol® PO 100).

PEI and its derivatives find many applications usually derived from its polycationic character. Because of the presence of amine groups, PEI can be protonated with acids to form a PEI salt from the surrounding medium resulting in a product that is partially or fully ionized depending on pH. For example, about 73% of PEI is protonated at pH 2, about 50% of PEI is protonated at pH 4, about 33% of PEI is protonated at pH 5, about 25% of PEI is protonated at pH 8 and about 4% of PEI is protonated at pH 10. In general, PEIs can be purchased as their protonated or unprotonated form with and without water. The commercial PEIs at pH 13 have a charge (cationic) density of about 16-17 meq/g (milliequivalents per gram).

The counterion of each protonated nitrogen center is balanced with an anion of an acid obtained during neutralization. Examples of protonated PEI salts include, but are not limited to, PEI-hydrochloride salt, PEI-sulfuric acid salt, PEI-nitric acid salt, PEI-acetic acid salt PEI fatty acid salt and the like. In fact, any acid can be used to protonate PEIs resulting in the formation of the corresponding PEI salt compound.

Suitable polyethyleneimine useful in the present disclosure may contain a mixture of primary, secondary, and tertiary amine substituents or mixture of different average molecular weights. The mixture of primary, secondary, and tertiary amine substituents may be in any ratio, including for example in the ratio of about 1:1:1 to about 1:2:1 with branching every 3 to 3.5 nitrogen atoms along a chain segment. Alternatively, suitable polyethyleneimine compounds may be primarily one of primary, secondary or tertiary amine substituents.

The polyamine that can be used to make the multiple charged cationic disclosed herein can have a wide range of its average molecular weight. Different multiple charged cationic compounds with their characteristic average molecular weights can be produced by selecting different starting small molecule polyamines, polymeric PEIs, or mixture thereof. Controlling the size of polyamines or PEI and extent of modification by the α, β-unsaturated compound and epoxide, one can produce the multiple charged cationic compounds with a similar average molecular weight and multiple cationic charges. Because of this character, one can produce and use different multiple charged cationic compounds for a wider range of applications that are using unmodified polyamine or PEIs.

Specifically, the polyamines that can be used to make the modified polyamines disclosed here have an average molecular weight ($M_w$) of about 60-200, about 100-400, about 100-600, about 600-5,000, about 600-800, about 800-2,000, about 800-5,000, about 100-2,000,000, about 100-25,000, about 600-25,000, about 800-25,000, about 600-750,000, about 800-750,000, about 25,000-750,000, about 750,000-2,000,000, about 100, about 200, about 300, about 400, about 500, about 600, about 700, about 800, about 1,000, about 1,500, about 2,000, about 3,000, about 5,000, about 8,000, about 10,000, about 15,000, about 20,000, about 50,000, about 100,000, about 250,000, about 500,000, about 1,000,000, about 2,000,000, or any value there between.

Aza-Michael Addition Reaction and Ring Opening Reaction of Epoxide

The multiple charged cationic compounds disclosed herein are derived from an aza-Michael Addition Reaction between a polyamine and Michael acceptor such as an activated olefin and from a ring opening reaction between a polyamine and epoxide. The aza Michael Addition Reaction and the ring opening reaction can happen sequentially or simultaneously. In some embodiments, the reaction products of the aza-Michael Addition reaction are further derived with a ring opening reaction of an epoxide. Alternatively, the multiple charged cationic compounds disclosed herein are derived from a ring opening reaction between a polyamine and epoxide and the products of the ring opening reaction then react with Michael acceptor such as an activated olefin or α, β-unsaturated carbonyl compound containing a hydrophilic (ionic) group through an aza-Michael Addition Reaction between the product.

An aliphatic amine group may undergo an aza-Michael Addition reaction when in contact with an unsaturated hydrocarbon moiety (e.g., carbon-carbon double bond) that is in proximity of an electron withdrawing group such as carbonyl, cyano, or nitro group. Specifically, the Michael addition is a reaction between nucleophiles and activated olefin and alkyne functionalities, wherein the nucleophile adds across a carbon-carbon multiple bond that is adjacent to an electron withdrawing and resonance stabilizing activating group, such as a carbonyl group. The Michael addition nucleophile is known as the "Michael donor", the activated electrophilic olefin is known as the "Michael acceptor", and reaction product of the two components is known as the "Michael adduct." Examples of Michael donors include, but are not restricted to, amines, thiols, phosphines, carbanions, and alkoxides. Examples of Michael acceptors include, but are not restricted to, acrylate esters, alkyl methacrylates, acrylonitrile, acrylamides, maleimides, cyanoacrylates and vinyl sulfones, vinyl ketones, nitro ethylenes, α, β-unsaturated aldehydes, vinyl phosphonates, acrylonitrile, vinyl pyridines, azo compounds, beta-keto acetylenes and acetylene esters.

As used herein, an "activated olefin" refers to a substituted alkene in which at least one of the double-bond carbons has a conjugated electron withdrawing group. Examples of activated olefins include, but not limited to, α, β-unsaturated carbonyl compounds (such as $CH_2=CHCO-NH-CH_3$, alkyl-CH=CH-CO-alkyl, $CH_2=CH_2C(O)-O-CH_3$), $CH_2=CH-COOH$, $CH_2=CH(CH_3)-COOH$, $CH_2=CH-SO_3H$, and like.

Aza-Michael addition reaction can be catalyzed by a strong acid or base. In some cases, some ionic liquids can function both as reaction media and catalyst. The preferred catalyst for the Aza-Michael addition reaction to synthesize the disclosed compounds is a base. Exemplary base catalyst can be hydroxide and amines. Because the reaction to synthesize the disclosed compounds uses a polyamine, the polyamine itself can function as a catalyst for the reaction. In such embodiments, no additional catalyst is necessary, or an additional catalyst is optional. Other preferred catalysts include amidine and guanidine bases.

The use of solvent and/or diluent for the reaction is optional. When employed, a wide range of non-acidic solvents are suitable, such as, for example, water, ethers (e.g., tetrahydrofuran (THF)), aromatic hydrocarbons (e.g., toluene and xylene), alcohols (e.g., n-butanol), and the like. A wide range of solvents can be used for the reaction because the synthesis process is relatively insensitive to solvent.

Generally, the reaction can be carried out at a temperature over a wide range of temperatures. The reaction temperature can range from about 0° C. to about 150° C., more preferably from about 50° C. to about 80° C. The reaction temperature can be about the same from starting of the reaction to end of the reaction and can be changed from one temperature to another while the reaction is going on.

The reaction time for the synthesis of the compounds disclosed herein can vary widely, depending on such factors as the reaction temperature, the efficacy and amount of the catalyst, the presence or absence of diluent (solvent), and the like. The preferred reaction time can be from about 0.5 hours to about 48 hours, from about 1 hour to 40 hours, from about 2 hours to 38 hours, from about 4 hours to about 36 hours, from 6 hours to about 34 hours, from about 8 hours to about 32 hours, from about 10 hours to about 30 hours, from about 12 hours to about 28 hours, from about 14 hours to 26 hours, from about 16 hours to 24 hours, from about 18 hours to 20 hours, from about 1 hour to 8 hours, from 8 hours to 16 hours, from 8 hours to about 24 hours, about 2 hours, about 4 hours, about 6 hours, about 8 hours, about 10 hours, about 14 hours, about 16 hours, about 18 hours, about 24 hours, about 30 hours, about 36 hours, or any values there between.

The ring opening reaction of an epoxide with an amine is also known in the prior art. This ring opening reaction can be done at a temperature of from about −20° C. to about 200° C. and in the presence of a catalyst, base, or acid. In some embodiments, the ring opening reaction is done free of a catalyst, base, or acid. In some other embodiments, the ring opening reaction is at a temperature from about 100° C. to about 150° C.; a different temperature for the aza Michael Addition reaction; in the presence of a different catalyst, base, or acid.

Both aza Michael addition and ring opening reactions for synthesis of the compounds disclosed can be accomplished when one mole of the polyamine and specified moles (two or more moles) of the activated olefin, the epoxide, and the both, are mixed together for a sufficient of time at a temperature described above.

It was found that the Aza-Michael addition and ring opening reaction of an epoxide can be used to synthesize the disclosed compounds without having to use a higher temperature greater than 200° C. and high pressure greater than normal atmosphere pressure and with a high yield (greater than 98%).

Additional Corrosion Control Composition Agent in a Corrosion Control Composition In addition to one or more multiple charged cationic compounds derived from polyamine, a corrosion control composition in the present disclosure includes one or more additional corrosion control composition agents.

The additional corrosion control composition agent in the disclosed corrosion control compositions can include, but is not limited to, an acid, peroxycarboxylic acid, peroxycarboxylic acid composition, carrier, dispersant, biocide, additional corrosion inhibitor, fouling control agent, antioxidant, polymer degradation prevention agent, permeability modifier, foaming agent, antifoaming agent, fracturing proppant, scavenger for $H_2S$, $CO_2$, and/or $O_2$, gelling agent, lubricant, friction reducing agent, salt, or mixtures thereof.

The additional corrosion control composition agent in the disclosed corrosion control compositions can also include, but not be limited to, an organic sulfur compound, asphaltene inhibitor, paraffin inhibitor, scale inhibitor, water clarifier, emulsion breaker, reverse emulsion breaker, gas hydrate inhibitor, a pH modifier, a surfactant, or a combination thereof.

Furthermore, the additional corrosion control composition agent can be a sequestrant, solubilizer, lubricant, buffer, cleaning agent, rinse aid, preservative, binder, thickener or other viscosity modifier, processing aid, carrier, water-conditioning agent, or foam generator, threshold agent or system, aesthetic enhancing agent (e.g., dye, odorant, perfume), or other additive suitable for formulation with a corrosion control composition, or mixtures thereof.

The additional corrosion control composition agent in the corrosion control composition disclosed herein will vary according to the specific corrosion control composition being manufactured and its intended use as one skilled in the art will appreciate.

Alternatively, the corrosion control composition does not contain or is free of one or more of the particular additional corrosion control composition agents.

When one or more additional corrosion control composition agents are used in the corrosion control compositions disclosed herein, they can be formulated together with the one or more multiple charged cationic compounds as described here in the same corrosion control composition. Alternatively, some or all the additional corrosion control composition agents can be formulated into one or more different formulations and be supplied to the water system. In other words, the additional corrosion control composition agents can be provided into a water system independently, simultaneously, or sequentially.

Acids

Generally, acids, as used in this disclosure, include both organic and inorganic acids. Organic acids include, but not limited to, hydroxyacetic (glycolic) acid, formic acid, acetic acid, propionic acid, butyric acid, valeric acid, caproic acid, gluconic acid, itaconic acid, trichloroacetic acid, urea hydrochloride, and benzoic acid. Organic acids also include dicarboxylic acids such as oxalic acid, malonic acid, succinic acid, glutaric acid, maleic acid, fumaric acid, adipic acid, and terephthalic acid. Combinations of these organic acids can also be used. Inorganic acids include, but are not limited to, mineral acids, such as phosphoric acid, sulfuric acid, sulfamic acid, methylsulfamic acid, hydrochloric acid, hydrobromic acid, hydrofluoric acid, and nitric acid. Inorganic acids can be used alone, in combination with other inorganic acid(s), or in combination with one or more organic acid. Acid generators can be used to form a suitable acid, including for example generators such as potassium fluoride, sodium fluoride, lithium fluoride, ammonium fluoride, ammonium bifluoride, sodium silicofluoride, etc.

Examples of particularly suitable acids in this the methods or compositions disclosed herein include inorganic and organic acids. Exemplary inorganic acids include phosphoric, phosphonic, sulfuric, sulfamic, methylsulfamic, hydrochloric, hydrobromic, hydrofluoric, and nitric. Exemplary organic acids include hydroxyacetic (glycolic), citric, lactic, formic, acetic, propionic, butyric, valeric, caproic, gluconic, itaconic, trichloroacetic, urea hydrochloride, and benzoic. Organic dicarboxylic acids can also be used such as oxalic, maleic, Fumaric, Adipic, And Terephthalic Acid.

Percarboxylic Acids and Peroxycarboxylic Acid Compositions

A peroxycarboxylic acid (e.g. peracid) or peroxycarboxylic acid composition can be included in the articles, products, or compositions disclosed herein. As used herein, the term "peracid" may also be referred to as a "percarboxylic acid," "peroxycarboxylic acid" or "peroxyacid." Sulfoperoxycarboxylic acids, sulfonated peracids and sulfonated peroxycarboxylic acids are also included within the terms "peroxycarboxylic acid" and "peracid" as used herein. As one of skill in the art appreciates, a peracid refers to an acid having the hydrogen of the hydroxyl group in carboxylic acid replaced by a hydroxy group. Oxidizing peracids may also be referred to herein as peroxycarboxylic acids.

A peracid includes any compound of the formula R—(COOOH)$_n$ in which R can be hydrogen, alkyl, alkenyl, alkyne, acylic, alicyclic group, aryl, heteroaryl, or heterocyclic group, and n is 1, 2, or 3, and named by prefixing the parent acid with peroxy. Preferably R includes hydrogen, alkyl, or alkenyl. The terms "alkyl," "alkenyl," "alkyne," "acylic," "alicyclic group," "aryl," "heteroaryl," and "heterocyclic group" are as defined herein.

A peroxycarboxylic acid composition, as used herein, refers to any composition that comprises one or more peracids, their corresponding acids, and hydrogen peroxide or other oxidizing agents. A peroxycarboxylic acid composition can also include a stabilizer, fluorescent active tracer or compound, or other ingredients, as one skilled in the other would know.

As used herein, the terms "mixed" or "mixture" when used relating to "percarboxylic acid composition," "percarboxylic acids," "peroxycarboxylic acid composition" or "peroxycarboxylic acids" refer to a composition or mixture including more than one percarboxylic acid or peroxycarboxylic acid. Peracids such as peroxyacetic acid and peroxyoctanoic acid may also be used. Any combination of these acids may also be used.

In some embodiments, however, the articles, products, or compositions disclosed herein are free of a peroxycarboxylic acid or peroxycarboxylic acid composition.

Biocide and Carrier

In some embodiments, the corrosion control compositions disclosed herein further include a biocide. In some other embodiments, the disclosed corrosion control compositions herein further include a carrier. In some other embodiments, the disclosed corrosion control compositions herein further include a biocide and carrier. In some embodiments, the disclosed methods or corrosion control compositions herein may consist of one or more multiple charged cationic compounds and carrier. In some embodiments, the corrosion control compositions disclosed herein consist of one or more multiple charged cationic compounds, a carrier, and biocide.

Biocides suitable for use may be oxidizing or non-oxidizing biocides. Oxidizing biocides include, but are not limited to, bleach, chlorine, bromine, chlorine dioxide, and materials capable of releasing chlorine and bromine. Non-oxidizing biocides include, but are not limited to, glutaraldehyde, isothiazolin, 2,2-dibromo-3-nitrilopropionamide, 2-bromo-2-nitropropane-1,3 diol, 1-bromo-1-(bromomethyl)-1,3-propanedicarbonitrile, tetrachloroisophthalonitrile, alkyldimethylbenzylammonium chloride, dimethyl dialkyl ammonium chloride, didecyl dimethyl ammonium chloride, poly(oxyethylene(dimethyliminio)ethylene(dimethyliminio)ethylene dichloride, methylene bisthiocyanate, 2-decylthioethanamine, tetrakishydroxymethyl phosphonium sulfate, dithiocarbamate, cyanodithioimidocarbonate, 2-methyl-5-nitroimidazole-1-ethanol, 2-(2-bromo-2-nitroethenyl)furan, beta-bromo-beta-nitrostyrene, beta-nitrostyrene, beta-nitrovinyl furan, 2-bromo-2-bromomethyl glutaronitrile, bis(trichloromethyl) sulfone, S-(2-hydroxypropyl)thiomethanesulfonate, tetrahydro-3,5-dimethyl-2H-1,3,5-hydrazine-2-thione, 2-(thiocyanomethylthio)benzothiazole, 2-bromo-4'-hydroxyacetophenone, 1,4-bis (bromoacetoxy)-2-butene, bis(tributyltin)oxide, 2-(tert-butylamino)-4-chloro-6-(ethylamino)-s-triazine, dodecylguanidine acetate, dodecylguanidine hydrochloride, coco alkyldimethylamine oxide, n-coco alkyltrimethylenediamine, tetra-alkyl phosphonium chloride, 7-oxabicyclo [2.2.1]heptane-2,3-dicarboxylic acid, 4,5-dichloro-2-n-octyl-4-isothiazoline-3-one, 5-chloro-2-methyl-4-isothiazolin-3-one and 2-methyl-4-isothiazolin-3-one.

Suitable non-oxidizing biocides also include, for example, aldehydes (e.g., formaldehyde, glutaraldehyde, and acrolein), amine-type compounds (e.g., quaternary amine compounds and cocodiamine), halogenated compounds (e.g., 2-bromo-2-nitropropane-3-diol (Bronopol) and 2-2-dibromo-3-nitrilopropionamide (DBNPA)), sulfur compounds (e.g., isothiazolone, carbamates, and metronidazole), and quaternary phosphonium salts (e.g., tetrakis(hydroxymethyl)-phosphonium sulfate (THPS)).

Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, peroxycarboxylic acid, peroxycarboxylic acid composition, and peroxides.

The composition can comprise from about 0.1 to about 10 wt-%, from about 0.5 to about 5 wt-%, or from about 0.5 to about 4 wt-% of a biocide, based on total weight of the composition.

A carrier in the disclosed corrosion control composition can be water, an organic solvent, or a combination of water and an organic solvent. The organic solvent can be an alcohol, a hydrocarbon, a ketone, an ether, an alkylene glycol, a glycol ether, an amide, a nitrile, a sulfoxide, an ester, or a combination thereof. Examples of suitable organic solvents include, but are not limited to, methanol, ethanol, propanol, isopropanol, butanol, 2-ethylhexanol, hexanol, octanol, decanol, 2-butoxyethanol, methylene glycol, ethylene glycol, 1,2-propylene glycol, 1,3-propylene glycol, diethyleneglycol monomethyl ether, diethylene glycol monoethyl ether, ethylene glycol monobutyl ether, ethylene glycol dibutyl ether, pentane, hexane, cyclohexane, methylcyclohexane, heptane, decane, dodecane, diesel, toluene, xylene, heavy aromatic naphtha, cyclohexanone, diisobutylketone, diethyl ether, propylene carbonate, N-methylpyrrolidinone, N,N-dimethylformamide, or a combination thereof.

The corrosion control composition can comprise from about 1 wt-% to about 80 wt-%, from about 1 wt-% to about 70 wt-%, from about 1 wt-% to about 60 wt-%, from about 1 wt-% to about 50 wt-%, from about 1 wt-% to about 40 wt-%, from about 1 wt-% to about 30 wt-%, from about 1 wt-% to about 20 wt-%, from about 1 wt-% to about 10 wt-%, from about 5 wt-% to about 10 wt-%, from about 5 wt-% to about 20 wt-%, from about 5 wt-% to about 30 wt-%, from about 5 wt-% to about 40 wt-%, from about 5 wt-% to about 50 wt-%, from about 10 wt-% to about 20 wt-%, from about 10 wt-% to about 30 wt-%, from about 10 wt-% to about 40 wt-%, from about 10 wt-% to about 50 wt-%, about 10 wt-%, about 20 wt-%, about 30 wt-%, about 40-%, about 50 wt-%, about 60 wt-%, about 70 wt-%, about 90 wt-%, or any value there between of the one or more carrier, based on total weight of the composition.

Additional Corrosion Inhibitor

In some embodiments, the corrosion control compositions disclosed herein can further include an additional corrosion inhibitor. In some other embodiments, the disclosed corrosion control compositions herein can further include an additional corrosion inhibitor and carrier. In some other embodiments, the disclosed corrosion control compositions herein further include an additional corrosion inhibitor, biocide, and carrier. In some embodiments, the disclosed corrosion control compositions herein may consist of one or more multiple charged cationic compounds, one or more additional corrosion inhibitors and carrier. In some embodiments, the corrosion control compositions disclosed herein consist of one or more multiple charged cationic compounds, a carrier, additional corrosion inhibitor, and a biocide.

The corrosion control composition can comprise from about 0.1 wt-% to about 20 wt-%, from about 0.1 wt-% to about 10 wt-%, or from 0.1 to about 5 wt-% of the one or more additional corrosion inhibitors, based on total weight of the composition. A composition disclosed herein can comprise from 0 to 10 percent by weight of the one or more additional corrosion inhibitors, based on total weight of the composition. The composition can comprise about 1.0 wt-%, about 1.5 wt-%, about 2.0 wt-%, about 2.5 wt-%, about 3.0 wt-%, about 3.5 wt-%, about 4.0 wt-%, about 4.5 wt-%, about 5.0 wt-%, about 5.5 wt-%, about 6.0 wt-%, about 6.5 wt-%, about 7.0 wt-%, about 7.5 wt-%, about 8.0 wt-%, about 8.5 wt-%, about 9.0 wt-%, about 9.5 wt-%, about 10.0 wt-%, about 10.5 wt-%, about 11.0 wt-%, about 11.5 wt-%, about 12.0 wt-%, about 12.5 wt-%, about 13.0 wt-%, about 13.5 wt-%, about 14.0 wt-%, about 14.5 wt-%, or about 15.0 wt-% of the one or more additional corrosion inhibitors, based on total weight of the composition. Each water system can have its own requirements for using an additional corrosion inhibitor, and the weight percent of one or more additional corrosion inhibitors in the composition can vary with the water system in which it is used.

An additional corrosion inhibitor may still be needed to further reduce corrosion of metals in the water system. Additional corrosion inhibitors for multi-metal protection are typically triazoles, such as, but not limited to, benzotriazole, halogenated triazoles, and nitro-substituted azoles.

The one or more additional corrosion inhibitors can be an imidazoline compound, a quaternary ammonium compound, a pyridinium compound, or a combination thereof.

The one or more additional corrosion inhibitors can be an imidazoline. The imidazoline can be, for example, imidazoline derived from a diamine, such as ethylene diamine (EDA), diethylene triamine (DETA), triethylene tetraamine (TETA) etc. and a long chain fatty acid such as tall oil fatty acid (TOFA). The imidazoline can be an imidazoline of Formula (1A) or an imidazoline derivative. Representative imidazoline derivatives include an imidazolinium compound of Formula (2A) or a bis-quaternized compound of Formula (3A).

The one or more additional corrosion inhibitors can include an imidazoline of Formula (1A):

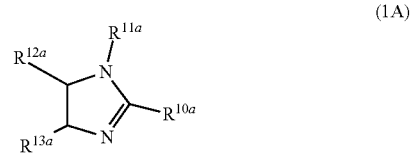

(1A)

wherein $R^{10a}$ is a $C_1$-$C_{20}$ alkyl or a $C_1$-$C_{20}$ alkoxyalkyl group; $R^{11a}$ is hydrogen, $C_1$-$C_6$ alkyl, $C_1$-$C_6$ hydroxyalkyl, or $C_1$-$C_6$ arylalkyl; and $R^{12a}$ and $R^{13a}$ are independently hydrogen or a $C_1$-$C_6$ alkyl group. Preferably, the imidazoline includes an $R^{10a}$ which is the alkyl mixture typical in tall oil fatty acid (TOFA), and $R^{11a}$, $R^{12a}$ and $R^{13a}$ are each hydrogen.

The one or more additional corrosion inhibitors can be an imidazolinium compound of Formula (2A):

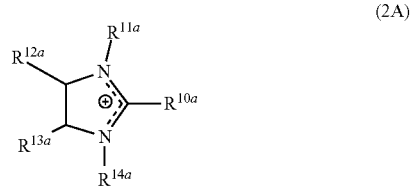

(2A)

wherein $R^{10a}$ is a $C_1$-$C_{20}$ alkyl or a $C_1$-$C_{20}$ alkoxyalkyl group; $R^{11a}$ and $R^{14a}$ are independently hydrogen, $C_1$-$C_6$ alkyl, $C_1$-$C_6$ hydroxyalkyl, or $C_1$-$C_6$ arylalkyl; $R^{12a}$ and $R^{13a}$ are independently hydrogen or a $C_1$-$C_6$ alkyl group; and $X^-$ is a halide (such as chloride, bromide, or iodide), carbonate, sulfonate, phosphate, or the anion of an organic carboxylic acid (such as acetate). Preferably, the imidazolinium compound includes 1-benzyl-1-(2-hydroxyethyl)-2-tall-oil-2-imidazolinium chloride.

The one or more additional corrosion inhibitors can be a bis-quaternized compound having the formula (3A):

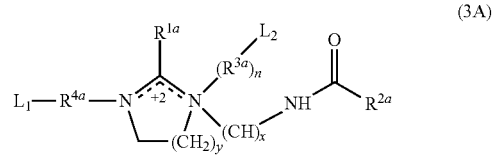

(3A)

wherein $R^{1a}$ and $R^{2a}$ are each independently unsubstituted branched, chain or ring alkyl or alkenyl having from 1 to about 29 carbon atoms; partially or fully oxygenized, sulfurized, and/or phosphorylized branched, chain, or ring alkyl or alkenyl having from 1 to about 29 carbon atoms; or a combination thereof; $R^{3a}$ and $R^{4a}$ are each independently unsubstituted branched, chain or ring alkylene or alkenylene having from 1 to about 29 carbon atoms; partially or fully oxygenized, sulfurized, and/or phosphorylized branched, chain, or ring alkylene or alkenylene having from 1 to about 29 carbon atoms; or a combination thereof; $L_1$ and $L_2$ are each independently absent, H, —COOH, —$SO_3H$, —$PO_3H$, —$COOR^{5a}$, —$CONH_2$, —$CONHR^{5a}$, or —$CON(R^{5a})_2$; $R^{5a}$ is each independently a branched or unbranched alkyl, aryl, alkylaryl, alkylheteroaryl, cycloalkyl, or heteroaryl group having from 1 to about 10 carbon atoms; n is 0 or 1, and when n is 0, L2 is absent or H; x is from 1 to about 10; and y is from 1 to about 5. Preferably, $R^{1a}$ and $R^{2a}$ are each independently $C_6$-$C_{22}$ alkyl, $C_8$-$C_{20}$ alkyl, $C_{12}$-$C_{18}$ alkyl, $C_{16}$-$C_{18}$ alkyl, or a combination thereof; $R^{3a}$ and $R^{4a}$ are $C_8$-$C_{10}$ alkylene, $C_2$-$C_8$ alkylene, $C_2$-$C_6$ alkylene, or $C_2$-$C_3$ alkylene; n is 0 or 1; xis 2; y is 1; $R_3$ and $R_4$ are —$C_2H_2$—; Li is —COOH, —$SO_3H$, or —$PO_3H$; and L2 is absent, H, —COOH, —$SO_3H$, or —$PO_3H$. For example, $R^{1a}$ and $R^{2a}$ can be derived from a mixture of tall oil fatty acids and are predominantly a mixture of $C_{17}H_{33}$ and $C_{17}H_{33}$ or can be $C_{16}$-$C_{18}$ alkyl; $R^{3a}$ and $R^{4a}$ can be $C_2$-$C_3$ alkylene such as —$C_2H_2$—; n is 1 and $L_2$ is —COOH or n is 0 and L2 is absent or H; x is 2; y is 1; $R^{3a}$ and $R^{4a}$ are —$C_2H_2$—; and Li is —COOH.

It should be appreciated that the number of carbon atoms specified for each group of formula (3A) refers to the main chain of carbon atoms and does not include carbon atoms that may be contributed by substituents.

The one or more additional corrosion inhibitors can be a bis-quaternized imidazoline compound having the formula (3A) wherein $R^{1a}$ and $R^{2a}$ are each independently $C_6$-$C_{22}$ alkyl, $C_8$-$C_{20}$ alkyl, $C_{12}$-$C_{18}$ alkyl, or $C_{16}$-$C_{18}$ alkyl or a combination thereof; $R^{4a}$ is $C_1$-$C_{10}$ alkylene, $C_2$-$C_8$ alkylene, $C_2$-$C_6$ alkylene, or $C_2$-$C_3$ alkylene; x is 2; y is 1; n is 0; Li is —COOH, —$SO_3H$, or —$PO_3H$; and $L_2$ is absent or H. Preferably, a bis-quaternized compound has the formula (3A) wherein $R^{1a}$ and $R^{2a}$ are each independently $C_{16}$-$C_{18}$ alkyl; $R^{4a}$ is —$C_2H_2$—; x is 2; y is 1; n is 0; $L_1$ is —COOH, —$SO_3H$, or —$PO_3H$ and $L_2$ is absent or H.

The one or more additional corrosion inhibitors can be a quaternary ammonium compound of Formula (4A):

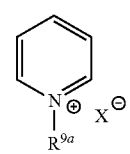

(4A)

wherein $R^{1a}$, $R^{2a}$, and $R^{3a}$ are independently $C_1$ to $C_{20}$ alkyl, $R^{4a}$ is methyl or benzyl, and X⁻is a halide or methosulfate.

Suitable alkyl, hydroxyalkyl, alkylaryl, arylalkyl or aryl amine quaternary salts include those alkylaryl, arylalkyl and aryl amine quaternary salts of the formula $[N^4R^{5a}R^{6a}R^{7a}R^{8a}][X^-]$ where $R^{5a}$, $R^{6a}$, $R^{7a}$, and $R^{8a}$ contain one to 18 carbon atoms, and X is Cl, Br or I. For the quaternary salts, $R_{5a}$, $R^{6a}$, $R^{7a}$ and $R^{8a}$ can each be independently alkyl (e.g., $C_1$-$C_{18}$ alkyl), hydroxyalkyl (e.g., $C_1$-$C_{18}$ hydroxyalkyl), and arylalkyl (e.g., benzyl). The mono or polycyclic aromatic amine salt with an alkyl or alkylaryl halide include salts of the formula $[N^4R^{5a}R^{6a}R^{7a}R^{8a}][X^-]$ wherein $R^{5a}$, $R^{6a}$, $R^{7a}$, and $R^{8a}$ contain one to 18 carbon atoms and at least one aryl group, and X is Cl, Br or I.

Suitable quaternary ammonium salts include, but are not limited to, a tetramethyl ammonium salt, a tetraethyl ammonium salt, a tetrapropyl ammonium salt, a tetrabutyl ammonium salt, a tetrahexyl ammonium salt, a tetraoctyl ammonium salt, a benzyltrimethyl ammonium salt, a benzyltriethyl ammonium salt, a phenyltrimethyl ammonium salt, a phenyltriethyl ammonium salt, a cetyl benzyldimethyl ammonium salt, a hexadecyl trimethyl ammonium salt, a dimethyl alkyl benzyl quaternary ammonium salt, a monomethyl dialkyl benzyl quaternary ammonium salt, or a trialkyl benzyl quaternary ammonium salt, wherein the alkyl group has about 6 to about 24 carbon atoms, about 10 and about 18 carbon atoms, or about 12 to about 16 carbon atoms. The quaternary ammonium salt can be a benzyl trialkyl quaternary ammonium salt, a benzyl triethanolamine quaternary ammonium salt, or a benzyl dimethylaminoethanolamine quaternary ammonium salt.

The one or more additional corrosion inhibitors can be a pyridinium salt such as those represented by Formula (5A):

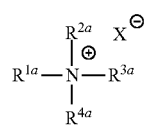

(5A)

wherein $R^{9a}$ is an alkyl group, an aryl group, or an arylalkyl group, wherein said alkyl groups have from 1 to about 18 carbon atoms and X⁻ is a halide such as chloride, bromide, or iodide. Among these compounds are alkyl pyridinium salts and alkyl pyridinium benzyl quats. Exemplary compounds include methyl pyridinium chloride, ethyl pyridinium chloride, propyl pyridinium chloride, butyl pyridinium chloride, octyl pyridinium chloride, decyl pyridinium chloride, lauryl pyridinium chloride, cetyl pyridinium chloride, benzyl pyridinium chloride and an alkyl benzyl pyridinium chloride, preferably wherein the alkyl is a $C_1$-$C_6$ hydrocarbyl group. Preferably, the pyridinium compound includes benzyl pyridinium chloride.

The one or more additional corrosion inhibitors can be a phosphate ester, monomeric or oligomeric fatty acid, alkoxylated amine, or mixture thereof.

The one or more additional corrosion inhibitors can be a phosphate ester. Suitable mono—, di- and tri-alkyl as well as alkylaryl phosphate esters and phosphate esters of mono, di, and triethanolamine typically contain between from 1 to about 18 carbon atoms. Preferred mono—, di- and trialkyl phosphate esters, alkylaryl or arylalkyl phosphate esters are those prepared by reacting a $C_3$-$C_{18}$ aliphatic alcohol with phosphorous pentoxide. The phosphate intermediate interchanges its ester groups with triethylphosphate producing a broader distribution of alkyl phosphate esters.

Alternatively, the phosphate ester can be made by admixing with an alkyl diester, a mixture of low molecular weight alkyl alcohols or diols. The low molecular weight alkyl alcohols or diols preferably include $C_6$ to $C_{10}$ alcohols or diols. Further, phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine are preferred.

The one or more additional corrosion inhibitors can be a monomeric or oligomeric fatty acid. Preferred monomeric or oligomeric fatty acids are $C_{14}$-$C_{22}$ saturated and unsaturated fatty acids as well as dimer, trimer and oligomer products obtained by polymerizing one or more of such fatty acids.

The one or more additional corrosion inhibitors can be an alkoxylated amine. The alkoxylated amine can be an ethoxylated alkyl amine. The alkoxylated amine can be ethoxylated tallow amine.

On the other hand, in some embodiments, the disclosed corrosion control composition is free of any corrosion inhibitor, except the one or more multiple charged cationic compounds disclosed herein, since the multiple charged cationic compounds disclosed can function as both corrosion inhibitor and fouling control agent.

Dispersant

In some embodiments, the corrosion control compositions disclosed herein can further comprise a dispersant. A dispersant keeps particulate matter present in the water of a water system dispersed, so that it does not agglomerate. The composition can comprise from about 0.1 to 10 wt-%, from about 0.5 to 5 wt-%, or from about 0.5 to 4 wt-% of a dispersant, based on total weight of the composition.

A dispersant may be an acrylic acid polymer, maleic acid polymer, copolymer of acrylic acid with sulfonated monomers, alkyl esters thereof, or combination thereof. These polymers may include terpolymers of acrylic acid, acrylamide and sulfonated monomers. These polymers may also include quad-polymers consisting of acrylic acid and three other monomers.

Suitable dispersants include, but are not limited to, aliphatic phosphonic acids with 2-50 carbons, such as hydroxyethyl diphosphonic acid, and aminoalkyl phosphonic acids, e.g. polyaminomethylene phosphonates with 2-10 N atoms e.g. each bearing at least one methylene phosphonic acid group; examples of the latter are ethylenediamine tetra(methylene phosphonate), diethylenetriamine penta(methylene phosphonate), and the triamine- and tetramine-polymethylene phosphonates with 2-4 methylene groups between each N atom, at least 2 of the numbers of methylene groups in each phosphonate being different. Other suitable dispersion agents include lignin, or derivatives of lignin such as lignosulfonate and naphthalene sulfonic acid and derivatives.

The corrosion control composition can further comprise an organic sulfur compound, such as a mercaptoalkyl alcohol, mercaptoacetic acid, thioglycolic acid, 3,3'-dithiodipropionic acid, sodium thiosulfate, thiourea, L-cysteine, tert-butyl mercaptan, sodium thiosulfate, ammonium thiosulfate, sodium thiocyanate, ammonium thiocyanate, sodium metabisulfite, or a combination thereof. Preferably, the mercaptoalkyl alcohol comprises 2-mercaptoethanol. Such compounds are used as synergists in the composition. The organic sulfur compound can constitute from about 0.5 wt-% to about 15 wt-% of the composition, based on total weight of the composition, preferably from about 1 wt-% to about 10 wt-% and more preferably from about 1 wt-% to about 5 wt-%. The organic sulfur compound can constitute about 1 wt-%, about 2 wt-%, about 3 wt-%, about 4 wt-%, about 5 wt-%, about 6 wt-%, about 7 wt-%, about 8 wt-%, about 9 wt-%, about 10 wt-%, about 11 wt-%, about 12 wt-%, about 13 wt-%, about 14 wt-%, or about 15 wt-% of the composition.

The organic sulfur compound is usually used as synergist. In some embodiments, the corrosion control composition comprises from about 1 wt-% to about 20 wt-% of the organic sulfur compound. In some other embodiments, the corrosion control composition comprises from about 1 wt-% to about 5 wt-% of the organic sulfur compound.

In some embodiments, the corrosion control composition comprises about 1 wt-% to about 5 wt-% of the organic sulfur compound; about 10 wt-% to about 20 wt-% of an additional corrosion inhibitor; and about 10 wt-% to about 20 wt-% of the multiple charged cationic compound. In some other embodiments, the corrosion control composition comprises about 1 wt-% to about 5 wt-% of the organic sulfur compound; about 10 wt-% to about 20 wt-% of an additional corrosion inhibitor; and about 10 wt-% to about 20 wt-% of the multiple charged cationic compound.

In some embodiments, the corrosion control composition comprises about 1 wt-% to about 5 wt-% of the organic sulfur compound; about 10 wt-% to about 20 wt-% of an imidazoline; and about 10 wt-% to about 20 wt-% of one or more multiple charged cationic compounds. In some other embodiments, the corrosion control composition comprises about 1 wt-% to about 5 wt-% of the organic sulfur compound; about 10 wt-% to about 20 wt-% of a quaternary ammonium compound (e.g., quaternized alkyl pyridine, quinoline, alkyldimethylamine, etc); and about 10 wt-% to about 20 wt-% of the multiple charged cationic compound. In some other embodiments, the corrosion control composition comprises about 1 wt-% to about 5 wt-% of the organic sulfur compound; about 10 wt-% to about 20 wt-% of a phosphate ester; and about 10 wt-% to about 20 wt-% of the multiple charged cationic compound.

The corrosion control composition can further comprise a de-emulsifier. Preferably, the de-emulsifier comprises an oxyalkylate polymer, such as a polyalkylene glycol. The de-emulsifier can constitute from about 0.1 wt-% to about 10 wt-%, from about 0.5 wt-% to about 5 wt. %, or from about 0.5 wt-% to about 4 wt-% of the composition, based on total weight of the composition. The de-emulsifier can constitute about 0.5 wt-%, about 1 wt-%, about 1.5 wt-%, about 2 wt-%, about 2.5 wt-%, about 3 wt-%, about 3.5 wt-%, about 4 wt-%, about 4.5 wt-%, or about 5 wt-% of the composition.

The corrosion control composition can further comprise an asphaltene inhibitor. The composition can comprise from about 0.1 wt-% to about 10 wt-%, from about 0.1 wt-% to about 5 wt-%, or from about 0.5 wt-% to about 4 wt-% of an asphaltene inhibitor, based on total weight of the composition. Suitable asphaltene inhibitors include, but are not limited to, aliphatic sulfonic acids; alkyl aryl sulfonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

The corrosion control composition can further comprise a paraffin inhibitor. The composition can comprise from about 0.1 wt-% to about 10 wt-%, from about 0.1 wt-% to about 5 wt-%, or from about 0.5 wt-% to about 4 wt-% of a paraffin inhibitor, based on total weight of the composition. Suitable paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable paraffin dispersants include, but are not limited to, dodecyl benzene sulfonate, oxyalkylated alkylphenols, and oxyalkylated alkylphenolic resins.

The corrosion control composition can further comprise a scale inhibitor. The composition can comprise from about 0.1 wt-% to about 20 wt-%, from about 0.5 wt-% to about 10 wt-%, or from about 1 wt-% to about 5 wt-% of a scale inhibitor, based on total weight of the composition. Suitable scale inhibitors include, but are not limited to, phosphates, phosphate esters, phosphoric acids, phosphonates, phosphonic acids, polyacrylamides, salts of acrylamidomethyl propane sulfonate/acrylic acid copolymer (AMPS/AA), phosphinated maleic copolymer (PHOS/MA), mono—, bis- and oligomeric phosphinosuccinic acid (PSO) derivatives, polycarboxylic acid, hydrophobically modified polycarboxylic acid, and salts of a polymaleic acid/acrylic acid/acrylamidomethyl propane sulfonate terpolymer (PMA/AA/AMPS).

The corrosion control composition can further comprise an emulsifier. The composition can comprise from about 0.1 wt-% to about 10 wt-%, from about 0.5 wt-% to about 5 wt-%, or from about 0.5 wt-% to about 4 wt-% of an emulsifier, based on total weight of the composition. Suitable emulsifiers include, but are not limited to, salts of carboxylic acids, products of acylation reactions between carboxylic acids or carboxylic anhydrides and amines, and alkyl, acyl and amide derivatives of saccharides (alkyl-saccharide emulsifiers).

The corrosion control composition can further comprise a water clarifier. The composition can comprise from about 0.1 wt-% to about 10 wt-%, from about 0.5 wt-% to about 5 wt-%, or from about 0.5 wt-% to about 4 wt-% of a water clarifier, based on total weight of the composition. Suitable water clarifiers include, but are not limited to, inorganic metal salts such as alum, aluminum chloride, and aluminum chlorohydrate, or organic polymers such as acrylic acid-based polymers, acrylamide-based polymers, polymerized amines, alkanolamines, thiocarbamates, and cationic polymers such as diallyldimethylammonium chloride (DADMAC).

The corrosion control composition can further comprise an emulsion breaker. The composition can comprise from about 0.1 wt-% to about 10 wt-%, from about 0.5 wt-% to about 5 wt-%, or from about 0.5 wt-% to about 4 wt-% of an emulsion breaker, based on total weight of the composition. Suitable emulsion breakers include, but are not limited to, dodecylbenzylsulfonic acid (DDBSA), the sodium salt of xylenesulfonic acid (NAXSA), epoxylated and propoxylated compounds, and resins, such as phenolic and epoxide resins.

The corrosion control composition can further comprise a hydrogen sulfide scavenger. The composition can comprise from about 1 wt-% to about 50 wt-%, from about 1 wt-% to about 40 wt-%, from about 1 wt-% to about 30 wt-%, from about 0.1 wt-% to about 10 wt-%, from about 0.5 wt-% to about 5 wt-%, or from about 0.5 wt-% to about 4 wt-% of a hydrogen sulfide scavenger, based on total weight of the composition. Suitable additional hydrogen sulfide scavengers include, but are not limited to, oxidants (e.g., inorganic peroxides such as sodium peroxide or chlorine dioxide); aldehydes (e.g., of 1-10 carbons such as formaldehyde, glyoxal, glutaraldehyde, acrolein, or methacrolein; triazines (e.g., monoethanolamine triazine, monomethylamine triazine, and triazines from multiple amines or mixtures thereof); condensation products of secondary or tertiary amines and aldehydes, and condensation products of alkyl alcohols and aldehydes.

The corrosion control composition can further comprise a gas hydrate inhibitor. The composition can comprise from about 0.1 wt-% to about 25 wt-%, from about 0.5 wt-% to about 20 wt-%, from about 1 wt-% to about 10 wt-%, from about 0.1 wt-% to about 10 wt-%, from about 0.5 wt-% to about 5 wt-%, or from about 0.5 wt-% to about 4 wt-% of a gas hydrate inhibitor, based on total weight of the composition. Suitable gas hydrate inhibitors include, but are not limited to, thermodynamic hydrate inhibitors (THI), kinetic hydrate inhibitors (KHI), and anti-agglomerates (AA). Suitable thermodynamic hydrate inhibitors include, but are not limited to, sodium chloride, potassium chloride, calcium chloride, magnesium chloride, sodium bromide, formate brines (e.g. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol)), methanol, propanol, ethanol, glycol ethers (such as diethyleneglycol monomethylether, ethyleneglycol monobutylether), and alkyl or cyclic esters of alcohols (such as ethyl lactate, butyl lactate, methylethyl benzoate).

The corrosion control composition can further comprise a kinetic hydrate inhibitor. The composition can comprise from about 0.1 wt-% to about 25 wt-%, from about 0.5 wt-% to about 20 wt-%, from about 1 wt-% to about 10 wt-%, from about 0.1 wt-% to about 10 wt-%, from about 0.5 wt-% to about 5 wt-%, or from about 0.5 wt-% to about 4 wt-% of a kinetic hydrate inhibitor, based on total weight of the composition. Suitable kinetic hydrate inhibitors and anti-agglomerates include, but are not limited to, polymers and copolymers, polysaccharides (such as hydroxyethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines, hydrocarbon based dispersants (such as lignosulfonates, iminodisuccinates, polyaspartates), amino acids, and proteins.

The corrosion control composition can further comprise a pH modifier. The composition can comprise from about 0.1 wt-% to about 20 wt-%, from about 0.5 wt-% to about 10 wt-%, or from about 0.5 wt-% to about 5 wt-% of a pH modifier, based on total weight of the composition. Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include sodium hydroxide, potassium hydroxide, calcium hydroxide, calcium oxide, sodium carbonate, potassium carbonate, sodium bicarbonate, potassium bicarbonate, magnesium oxide, and magnesium hydroxide.

The corrosion control composition can further comprise a fouling control agent. In some embodiments, the fouling control agent is fouling control agent a single quaternary compound. The composition can comprise from about 0.1 wt-% to about 10 wt-%, from about 0.5 wt-% to about 5 wt-%, or from about 0.5 wt-% to about 4 wt-% of a fouling control agent, based on total weight of the composition.

On the other hand, in some embodiments, the disclosed corrosion control composition is free of any fouling control agent, except the one or more multiple charged cationic compounds disclosed herein, since the multiple charged cationic compounds disclosed can function as both corrosion inhibitor and fouling control agent.

The corrosion control composition can further comprise a surfactant. The composition can comprise from about 0.1 wt-% to about 10 wt-%, from about 0.5 wt-% to about 5 wt-%, or from about 0.5 wt-% to about 4 wt-% of a surfactant, based on total weight of the composition. A suitable surfactant can be a nonionic, semi-nonionic, cat-ionic, anionic, amphoteric, zwitterionic, Gemini, di-cationic, di-anionic surfactant, or mixtures thereof.

The corrosion control composition can further comprise additional corrosion control composition agents that provide a functional and/or beneficial property. For example, additional corrosion control composition agents can be a sequestrant, solubilizer, lubricant, buffer, cleaning agent, rinse aid, preservative, binder, thickener or other viscosity modifier, processing aid, water-conditioning agent, foam inhibitor or foam generator, threshold agent or system, aesthetic enhancing agent (e.g., dye, odorant, perfume), or other agents suitable for formulation with the corrosion control composition, and mixtures thereof. Additional agents or additives will vary according to the specific corrosion control composition being manufactured and its intend use as one skilled in the art will appreciate.

Alternatively, the corrosion control composition does not contain or is free of any of the additional corrosion control composition agents. Additionally, the corrosion control composition can be formulated into compositions comprising the following components as shown in Tables 1A-1B. These formulations include the ranges of the components listed and can optionally include additional agents. The values in Tables 1A-1B below are weight percentages.

TABLE 1A

Exemplary Corrosion control compositions

| Component | 1 | 2 | 3 | 4 | 5 | 6 | 7 | 8 | 9 | 10 | 11 | 12 |
|---|---|---|---|---|---|---|---|---|---|---|---|---|
| Multiple charged cationic compound | 0.1-20 | 0.1-20 | 0.1-20 | 0.1-20 | 0.1-20 | 0.1-20 | 10-20 | 10-20 | 10-20 | 10-20 | 10-20 | 0.1-20 |
| Surfactant | 5-40 | — | 5-50 | — | 5-50 | 5-50 | 5-40 | — | 5-50 | — | — | 10-20 |
| Additional corrosion inhibitor | 0.1-20 | 0.1-20 | — | — | — | — | 0.1-20 | 0.1-20 | — | — | — | 0.1-20 |
| Preservative | 0.1-5 | 0.1-5 | 0.1-5 | 0.1-5 | — | — | 0.1-5 | 0.1-5 | 0.1-5 | — | — | 0.1-5 |
| Scale inhibitor | 1-10 | 1-10 | 1-10 | 1-10 | 1-10 | — | 1-10 | 1-10 | 1-10 | 1-10 | — | 1-10 |
| Water Clarifier | — | — | — | — | — | — | — | — | — | — | — | 0.1-25 |
| Biocide | 0.5-5 | 0.5-5 | 0.5-5 | 0.5-5 | 0.5-5 | 0.5-5 | 0.5-5 | 0.5-5 | 0.5-5 | 0.5-5 | 0.5-5 | — |
| Water | 0.00 | 0-40 | 0-10 | 0-60 | 0-15 | 0-25 | 0.00 | 0-40 | 0-10 | 0-65 | 0-75 | — |

TABLE 1B

Exemplary Corrosion control compositions

| Component | 13 | 14 | 15 | 16 | 17 | 18 | 19 | 20 | 21 | 22 | 23 | 24 |
|---|---|---|---|---|---|---|---|---|---|---|---|---|
| Multiple charged cationic compound | 0.1-20 | 0.1-20 | 0.1-20 | 0.1-20 | 0.1-20 | 0.1-20 | 10-20 | 10-20 | 10-20 | 10-20 | 10-20 | 10-20 |
| Surfactant | — | 10-20 | — | 10-35 | 10-35 | — | 10-15 | — | — | 10-35 | 10-35 | — |
| Additional Corrosion inhibitor | 0.1-20 | 0.1-20 | 0.1-20 | 0.1-20 | 0.1-20 | 0.1-20 | 0.1-20 | 0.1-20 | 0.1-20 | 0.1-20 | 0.1-20 | 0.1-20 |
| Preservative | 0.1-5 | — | — | — | — | — | 0.1-5 | — | — | — | — | — |
| Scale inhibitor | 1-10 | 1-10 | — | — | 1-10 | — | 1-10 | 1-10 | — | — | — | 1-10 |
| Water Clarifier | 0.1-25 | 0.1-25 | 0.1-25 | — | — | — | 0.1-25 | 0.1-25 | 0.1-25 | — | 0.1-25 | — |
| Biocide | — | — | — | — | — | 0.5-5 | 0.5-5 | 0.5-5 | 0.5-5 | 0.5-5 | — | — |
| Water | 0-20 | 0-5 | 0-35 | 0-25 | 0-15 | 0-55 | 0.00 | 0-20 | 0-30 | 0-20 | 0.00 | 0-50 |

Water System

As water system as used in this disclosure includes both water and surfaces that have contact with the water. In some embodiments, the water system in the disclosed methods herein is an industrial water system. In other embodiments, the water system can be, but is not limited to, a cooling water system, including an open recirculating system, closed and once-through cooling water system, boilers and boiler water system, petroleum well system, downhole formation, geothermal well, and other water system in oil and gas field applications, a mineral washing system, flotation and benefaction system, paper mill digester, washer, bleach plant, stock chest, white water system, paper machine surface, black liquor evaporator in the pulp industry, gas scrubber and air washer, continuous casting processes in the metallurgical industry, air conditioning and refrigeration system, industrial and petroleum process water, indirect contact cooling and heating water, water reclamation system, water purification system, membrane filtration water system, food processing stream (meat, vegetable, sugar beets, sugar cane, grain, poultry, fruit and soybean), waste treatment system, clarifier, liquid-solid application, municipal sewage treatment, municipal water system, potable water system, aquifer, water tank, sprinkler system, or water heater.

In some embodiments, the water system is a cooling water system, including open recirculating, closed and once-through cooling water system, paper machine surface, food processing stream, waste treatment system, or potable water system.

In some embodiments, the water system is any system including a wetable surface, particularly a wetable metal surface. Examples of surfaces in such water systems include, but are not limited to, walls and floors of bathrooms or surfaces of pipes or containers. Surfaces or metal surfaces are typically in constant contact with water or water moisture and subjected to biofilm growth or corrosion.

In some embodiments, the water system comprises a metal surface. In some other embodiments, the water system comprises a surface that is made of steel or other metal or comprises steel or other metals that are subjected to corrosion.

Use of the Methods or Compositions Disclosed

In some embodiments, for the methods disclosed herein, providing a corrosion control composition into a water system means that the corrosion control composition or multiple charged cationic compounds are added into a fluid comprising water or onto surfaces of a water system. In other embodiments, providing a corrosion control composition into a water system means adding the corrosion control composition or multiple charged cationic compounds to the surface or water of the water system. In some other embodiments, providing a corrosion control composition into a water system means adding the corrosion control composition or multiple charged cationic compounds to a fluid or gas which contacts the surfaces of the water system. The corrosion control composition or multiple charged cationic compounds may be added continuously, or intermittently when more compounds or compositions may be needed.

In some embodiments, the corrosion control composition or multiple charged cationic compounds may be added to the water of the water system in an amount ranging from about 0.1 ppm to about 1000 ppm. In other embodiments, the amount of the corrosion control composition or multiple charged cationic compounds in the water of the water system may range from about 1 ppm to about 100 ppm, from about 5 ppm to about 100 ppm, from about 5 ppm to about 50 ppm, from about 5 ppm to about 40 ppm, from about 5 ppm to about 30 ppm, from about 10 ppm to about 60 ppm, from about 10 ppm to about 50 ppm, from about 10 ppm to about 40 ppm, from about 10 ppm to about 30 ppm, from about 20 ppm to about 60 ppm, from about 20 ppm to about 50 ppm, from about 20 ppm to about 40 ppm, or from about 20 ppm to about 30 ppm. In some embodiments, the corrosion control composition or multiple charged cationic compounds may be added to the water to an amount ranging from about 100 ppm to about 1000 ppm, from about 125 ppm to about 1000 ppm, from about 250 ppm to about 1000 ppm, or from about 500 ppm to about 1000 ppm in the treated water system.

The corrosion control composition or multiple charged cationic compounds can be used for corrosion control in oil and gas applications such as by treating a gas or liquid stream with an effective amount of the compound or composition as described herein. The compounds and compositions can be used in any industry where it is desirable to prevent microbial or biofilm growth at a surface.

The corrosion control composition or multiple charged cationic compounds can be used in a condensate/oil systems/gas system, or any combination thereof. For example, the corrosion control composition or multiple charged cationic compounds can be used in corrosion control on heat exchanger surfaces. The corrosion control composition or multiple charged cationic compounds can be applied to a gas or liquid produced, or used in the production, transportation, storage, and/or separation of crude oil or natural gas. The corrosion control composition or multiple charged cationic compounds can be applied to a gas stream used or produced in a coal-fired process, such as a coal-fired power plant.

The corrosion control composition or multiple charged cationic compounds can be applied to a gas or liquid produced or used in a waste-water process, a farm, a slaughterhouse, a land-fill, a municipality waste-water plant, a coking coal process, or a biofuel process.

A fluid to which the corrosion control composition or multiple charged cationic compounds can be introduced can be an aqueous medium. The aqueous medium can comprise water, gas, and optionally liquid hydrocarbon.

A fluid to which the corrosion control composition or multiple charged cationic compounds can be introduced can be a liquid hydrocarbon. The liquid hydrocarbon can be any type of liquid hydrocarbon including, but not limited to, crude oil, heavy oil, processed residual oil, bituminous oil, coker oils, coker gas oils, fluid catalytic cracker feeds, gas oil, naphtha, fluid catalytic cracking slurry, diesel fuel, fuel oil, jet fuel, gasoline, and kerosene. The fluid or gas can be a refined hydrocarbon product.

A fluid or gas treated with the corrosion control composition or multiple charged cationic compounds can be at any selected temperature, such as ambient temperature or an elevated temperature. The fluid (e.g., liquid hydrocarbon) or gas can be at a temperature of from about 40° C. to about 250° C. The fluid or gas can be at a temperature of from about 40° C. to about 250° C. The fluid or gas can be at a temperature of from about −50° C. to about 300° C., from about 0° C. to about 200° C., from about 10° C. to about 100° C., or from about 20° C. to about 90° C. The fluid or gas can be at a temperature of about 22° C., about 23° C., about 24° C., about 25° C., about 26° C., about 27° C., about 28° C., about 29° C., about 30° C., about 31° C., about 32° C., about 33° C., about 34° C., about 35° C., about 36° C., about 37° C., about 38° C., about 39° C., or about 40° C. The fluid or gas can be at a temperature of about 85° C., about 86° C., about 87° C., about 88° C., about 89° C., about 90°

C., about 91° C., about 92° C., about 93° C., about 94° C., about 95° C., about 96° C., about 97° C., about 98° C., about 99° C., or about 100° C.

The corrosion control composition or multiple charged cationic compounds can be added to a fluid at various levels of water cut. For example, the water cut can be from 0% to 100% volume/volume (v/v), from 1% to 80% v/v, or from 1% to 60% v/v. The fluid can be an aqueous medium that contains various levels of salinity. The fluid can have a salinity of 0% to 25%, about 1% to 24%, or about 10% to 25% weight/weight (w/w) total dissolved solids (TDS).

The fluid or gas in which the corrosion control composition or multiple charged cationic compounds are introduced can be contained in and/or exposed to many different types of apparatuses. For example, the fluid or gas can be contained in an apparatus that transports fluid or gas from one point to another, such as an oil and/or gas pipeline. The apparatus can be part of an oil and/or gas refinery, such as a pipeline, a separation vessel, a dehydration unit, or a gas line. The fluid can be contained in and/or exposed to an apparatus used in oil extraction and/or production, such as a wellhead. The apparatus can be part of a coal-fired power plant. The apparatus can be a scrubber (e.g., a wet flue gas desulfurizer, a spray dry absorber, a dry sorbent injector, a spray tower, a contact or bubble tower, or the like). The apparatus can be a cargo vessel, a storage vessel, a holding tank, or a pipeline connecting the tanks, vessels, or processing units.

The corrosion control composition or multiple charged cationic compounds can be introduced into a fluid or gas of the water system by any appropriate method for ensuring dispersal through the fluid or gas. For examples, the corrosion control composition or multiple charged cationic compounds can be added to the hydrocarbon fluid before the hydrocarbon fluid contacts the surface.

The corrosion control composition or multiple charged cationic compounds can be added at a point in a flow line upstream from the point at which corrosion control is desired. The corrosion control composition or multiple charged cationic compounds can be injected using mechanical equipment such as chemical injection pumps, piping tees, injection fittings, atomizers, quills, and the like.

The corrosion control composition or multiple charged cationic compounds can be pumped into an oil and/or gas pipeline using an umbilical line. A capillary injection system can be used to deliver the corrosion control composition or multiple charged cationic compounds to a selected fluid.

A fluid to which the corrosion control composition or multiple charged cationic compounds can be introduced can be an aqueous medium. The aqueous medium can comprise water, gas, and optionally liquid hydrocarbon. A fluid to the corrosion control composition or multiple charged cationic compounds can be introduced can be a liquid hydrocarbon.

The corrosion control composition or multiple charged cationic compounds can be introduced into a liquid and a mixture of several liquids, a liquid and gas, liquid, solid, and gas. The corrosion control composition or multiple charged cationic compounds can be injected into a gas stream as an aqueous or non-aqueous solution, mixture, or slurry.

The fluid or gas can be passed through an absorption tower comprising the corrosion control composition or multiple charged cationic compounds.

The corrosion control composition or multiple charged cationic compounds can be applied to a fluid or gas to provide any selected concentration. In practice, the corrosion control composition or multiple charged cationic compounds are typically added to a flow line to provide an effective treating dose of the corrosion control composition or multiple charged cationic compounds from about 0.01 to about 5,000 ppm. The corrosion control composition or multiple charged cationic compounds can be applied to a fluid or gas to provide an active concentration of about 1 part per million (ppm) to about 1,000,000 ppm, about 1 part per million (ppm) to about 100,000 ppm, or from about 10 ppm to about 75,000 ppm. The multiple charged cationic compound/compositions can be applied to a fluid to provide an actives concentration of from about 100 ppm to about 10,000 ppm, from about 200 ppm to about 8,000 ppm, or from about 500 ppm to about 6,000 ppm. The actives concentration means the concentration of corrosion control composition or multiple charged cationic compounds.

The corrosion control composition or multiple charged cationic compounds can be applied to a fluid or gas to provide an active concentration of about 0.1 ppm, about 0.5 ppm, about 1 ppm, about 2 ppm, about 5 ppm, about 10 ppm, about 20 ppm, about 100 ppm, about 200 ppm, about 500 ppm, or about 1,000 ppm. The polymer salts/compositions can be applied to a fluid or gas to provide an actives concentration of about 0.125 ppm, about 0.25 ppm, about 0.625 ppm, about 1 ppm, about 1.25 ppm, about 2.5 ppm, about 5 ppm, about 10 ppm, or about 20 ppm in the treated fluid, gas, or water system. Each water system can have its own dose level requirements, and the effective dose level of the corrosion control composition or multiple charged cationic compounds to sufficiently reduce the rate of microbial or biofilm growth can vary with the water system in which it is used.

The corrosion control composition or multiple charged cationic compounds can be applied continuously, in batch, or a combination thereof. The corrosion control composition or multiple charged cationic compounds dosing can be continuous. The corrosion control composition or multiple charged cationic compounds dosing can be intermittent (e.g., batch treatment) or can be continuous/maintained and/or intermittent.

Dosage rates for continuous treatments typically range from about 10 to about 500 ppm, or from about 10 ppm to about 200 ppm. Dosage rates for batch treatments typically range from about 10 ppm to about 400,000 ppm, or from about 10 ppm to about 20,000 ppm. The corrosion control composition or multiple charged cationic compounds can be applied as a pill to a pipeline, providing a high dose (e.g., 20,000 ppm) of the composition.

The flow rate of a flow line in which the corrosion control composition or multiple charged cationic compounds is used can be between about 0.1 feet per second and about 100 feet per second, or between about 0.1 feet per second and about 50 feet per second. The corrosion control composition or multiple charged cationic compounds can also be formulated with water to facilitate addition to the flow line.

The surface can be a part of a wellbore or equipment used in the production, transportation, storage, and/or separation of a fluid such as crude oil or natural gas. More specifically, the surface can be a part of equipment used a coal-fired process, a waste-water process, a farm, a slaughterhouse, a land-fill, a municipality waste-water plant, a coking coal process, or a biofuel process. Preferably, the surface can be a part of equipment used in the production of crude oil or natural gas.

The equipment can comprise a pipeline, a storage vessel, downhole injection tubing, a flow line, or an injection line.

The corrosion control composition or multiple charged cationic compounds are useful for corrosion inhibition of containers, processing facilities, or equipment in the food service or food processing industries. The corrosion control composition or multiple charged cationic compounds have particular value for use on food packaging materials and equipment, and especially for cold or hot aseptic packaging. Examples of process facilities in which the corrosion control composition or multiple charged cationic compounds can be employed include a milk line dairy, a continuous brewing system, food processing lines such as pumpable food systems and beverage lines, ware wash machines, low temperature ware wash machines, dishware, bottle washers, bottle chillers, warmers, third sink washers, processing equipment such as tanks, vats, lines, pumps and hoses (e.g., dairy processing equipment for processing milk, cheese, ice cream and other dairy products), and transportation vehicles. The corrosion control composition or multiple charged cationic compounds can be used to inhibit corrosion in tanks, lines, pumps, and other equipment used for the manufacture and storage of soft drink materials, and also used in the bottling or containers for the beverages.

The corrosion control composition or multiple charged cationic compounds can also be used on or in other industrial equipment and in other industrial process streams such as heaters, cooling towers, boilers, retort waters, rinse waters, aseptic packaging wash waters, and the like. The corrosion control composition or multiple charged cationic compounds can be used to treat surfaces in recreational waters such as in pools, spas, recreational flumes and water slides, fountains, and the like.

The corrosion control composition or multiple charged cationic compounds can be used to treat surfaces contacted with cleaners in surfaces found in janitorial and/or housekeeping applications, food processing equipment and/or plant applications, and in laundry applications. For example, washers, such as tunnel washers for washing textiles, can be treated according to methods disclosed herein.

The corrosion control composition or multiple charged cationic compounds can be used or applied in combination with low temperature dish and/or ware wash sanitizing final rinse, toilet bowl cleaners, and laundry bleaches. The corrosion control composition or multiple charged cationic compounds can be used to treat metal surfaces, such as ware, cleaned and/or sanitized with corrosive sources.

The corrosion control composition or multiple charged cationic compounds can be dispensed in any suitable method generally known by one skilled in the art. For example, a spray-type dispenser can be used. A spray-type dispenser functions by impinging a water spray upon an exposed surface of a composition to dissolve a portion of the composition, and then immediately directing the concentrate solution including the composition out of the dispenser to a storage reservoir or directly to a point of use.

The corrosion control composition or multiple charged cationic compounds can be dispensed by immersing either intermittently or continuously in the water, fluid, or gas of the water system. The corrosion control composition or multiple charged cationic compounds can then dissolve, for example, at a controlled or predetermined rate. The rate can be effective to maintain a concentration of the dissolved compounds or compositions that are effective for use according to the methods disclosed herein.

The corrosion control composition disclosed herein can comprise from about 10 to about 90 wt-% of the carrier, biocide, corrosion inhibitor, additional corrosion control composition agent, a combination thereof and from about 10 wt-% to about 90 wt-% of one or more multiple charged cationic compounds; from about 20 wt-% to about 80 wt-% of the carrier, biocide, corrosion inhibitor, additional corrosion control composition agent, a combination thereof and from about 10 wt-% to about 80 wt-% of one or more multiple charged cationic compounds, from about 30 wt-% to about 70 wt-% of the carrier, biocide, corrosion inhibitor, additional corrosion control composition agent, or a combination thereof and from about 30 wt-% to about 70 wt-% of one or more multiple charged cationic compounds, or from about 40 wt-% to about 60 wt-% of the carrier, biocide, corrosion inhibitor, additional corrosion control composition agent, or a combination thereof and from about 70 wt-% to about 84 wt. % of one or more multiple charged cationic compounds.

In one aspect, disclosed herein is a method for controlling corrosion in a water system, wherein the method comprises providing a corrosion control composition or a use solution of the corrosion control composition into a water system to generate a treated water system or onto a metal surface of the water system, wherein the corrosion control composition comprises one or more multiple charged cationic compounds; wherein the multiple charged cationic compounds are derived from a polyamine through its reactions with an epoxide or an activated olefin and an epoxide, wherein the activated olefin has the following formula:

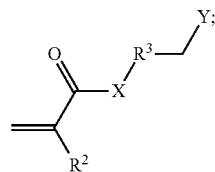

X is NH or O; $R^2$ is H, $CH_3$, or an unsubstituted, linear or branched $C_2$-$C_{10}$ alkyl, alkenyl, or alkynyl group; $R^3$ is absent or an unsubstituted, linear or branched $C_1$-$C_{30}$ alkylene group; Y is $-NR_4R_5R_6^{(+)}$; $R^4$, $R^5$, and $R^6$ are independently a $C_1$-$C_{10}$ alkyl group; wherein the epoxide has the following formula:

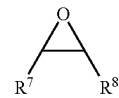

$R^7$ is H or alkyl; and $R^8$ is alkyl, or $-(CH_2)_k-$O-alkyl, wherein k is an integer of 1-30; wherein the polyamine and activated olefin undergo aza Michael Addition reaction and the polyamine and epoxide undergo ring opening reaction; wherein the compound has 1, 2, 3, or more positive charges from the activated olefin and at least one nonionic group from the epoxide or has at least one nonionic group from the epoxide; and wherein the corrosion control composition reduces corrosion on the metal surface in the water system.

In some embodiments, the multiple charged compound has one of the generic formula of $NA_2$-$[R^{10'}]_n$-$NA_2$, $(RNA)_n$-$RNA_2$, $NA_2$-$(RNA)_n$-$RNA_2$, or $NA_2$-$(RN(R'))_n$-$RNA_2$, wherein $R^{10'}$ is a linear or branched, unsubstituted or substituted $C_2$-$C_{10}$ alkylene group, or combination thereof; R is $-CH_2-$, $-CH_2CH_2-$, $-CH_2CH_2CH_2-$, $-CH(CH_3)CH_2-$, a linear or branched, unsubstituted or substituted $C_4$-$C_{10}$ alkylene group, or combination thereof; R' is $-CH_2-$, $-CH_2CH_2-$, $-CH_2CH_2CH_2-$, $-CH(CH_3)CH_2-$, a linear or branched, unsubstituted or substituted $C_4$-$C_{10}$ alkyl group, $RNA_2$, $RNARNA_2$, or $RN(RNA_2)_2$; n can P be from 2 to 1,000,000; A is a proton,

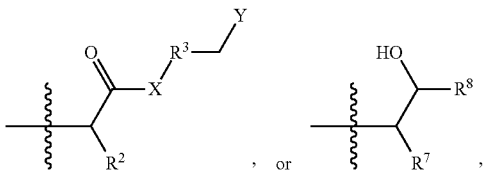

or a proton, or

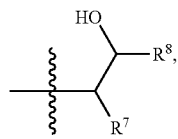

wherein X is NH or O; $R^2$ is H, $CH_3$, or an unsubstituted, linear or branched $C_2$-$C_{10}$ alkyl, alkenyl, or alkynyl group; $R^3$ is absent or an unsubstituted, linear or branched $C_1$-$C_{30}$ alkylene group; Y is —$NR_4R_5R_6^{(+)}$; $R^4$, $R^5$, and $R^6$ are independently a $C_1$-$C_{10}$ alkyl group; $R^7$ is H or alkyl; and $R^8$ is alkyl, or —$(CH_2)_k$—O-alkyl, wherein k is an integer of 1-30; wherein the compound is a multiple charged cationic compound having 1, 2, 3, or more

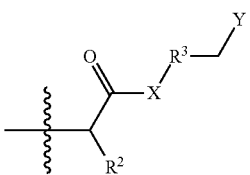

groups and at least one

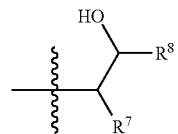

group or having at least one

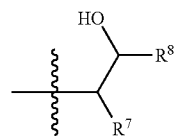

group.

In some embodiments, the multiple charged compound disclosed herein has at least one nonionic group and derived from a polyamine's reaction with an epoxide alone. In some embodiments, the multiple charged compound disclosed herein has at least one nonionic group and at least one cationic group and derived from a polyamine's reactions with an epoxide and activated olefin.

In another aspect, disclosed herein is a corrosion control composition for a water system, wherein the composition mitigates corrosion on a metal surface in a water system and comprises one or more multiple charged cationic compounds as disclosed herein and one or more corrosion control composition agents.

In some embodiments, the corrosion control composition can reduce or mitigate corrosion on a metal surface to about 280 mpy, about 265, about 250 mpy, about 225 mpy, about 200 mpy, about 175 mpy, about 150 mpy, about 175 mpy, about 100 mpy, or any value there between, when the multiple charged cationic compound is at about 4 ppm and corrosion rate is measured by a bubble cell test.

In some embodiments, the multiple charge compound is $NA_2$-$[R^{10'}]_n$-$NA_2$. In some other embodiments, the multiple charge compound is $(RNA)_n$-$RNA_2$. In yet some other embodiments, the multiple charge compound is $NA_2$-$(RNA)_n$-$RNA_2$. In some other embodiments, the multiple charge compound is $NA_2$-$(RN(R'))_n$-$RNA_2$.

In some embodiments, $R^7$ is H. In some other embodiments, $R^7$ is a $C_1$-$C_4$ alkyl group. In yet some other embodiments, $R^8$ is a $C_{12}$-$C_{20}$ alkyl group.

The multiple charge cationic compounds disclosed here are derived from a polyamine as a result of its aza-Michael addition with an activated olefin, such as α, β-unsaturated carbonyl compound, having a cationic group and its ring opening reaction with an epoxide or from a polyamine as a result of its ring opening reaction with an epoxide.

Figure 2:
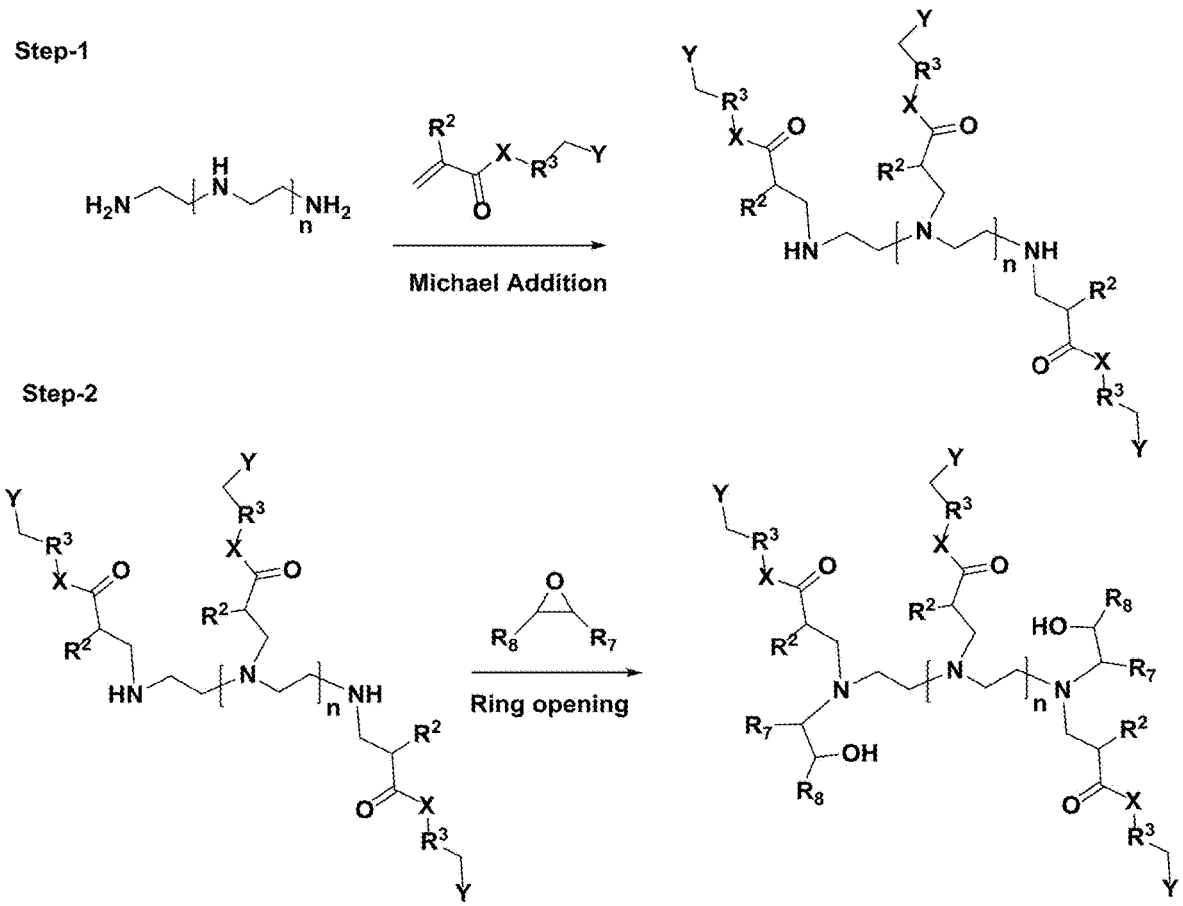
FIG. 2 shows an exemplary alternate generic reaction scheme to produce a multiple charged cationic compound first by an aza-Michael addition reaction between a linear polyethyleneimine and α, β-unsaturated carbonyl compound and then a ring-opening reaction with an epoxide.
Figure 3:
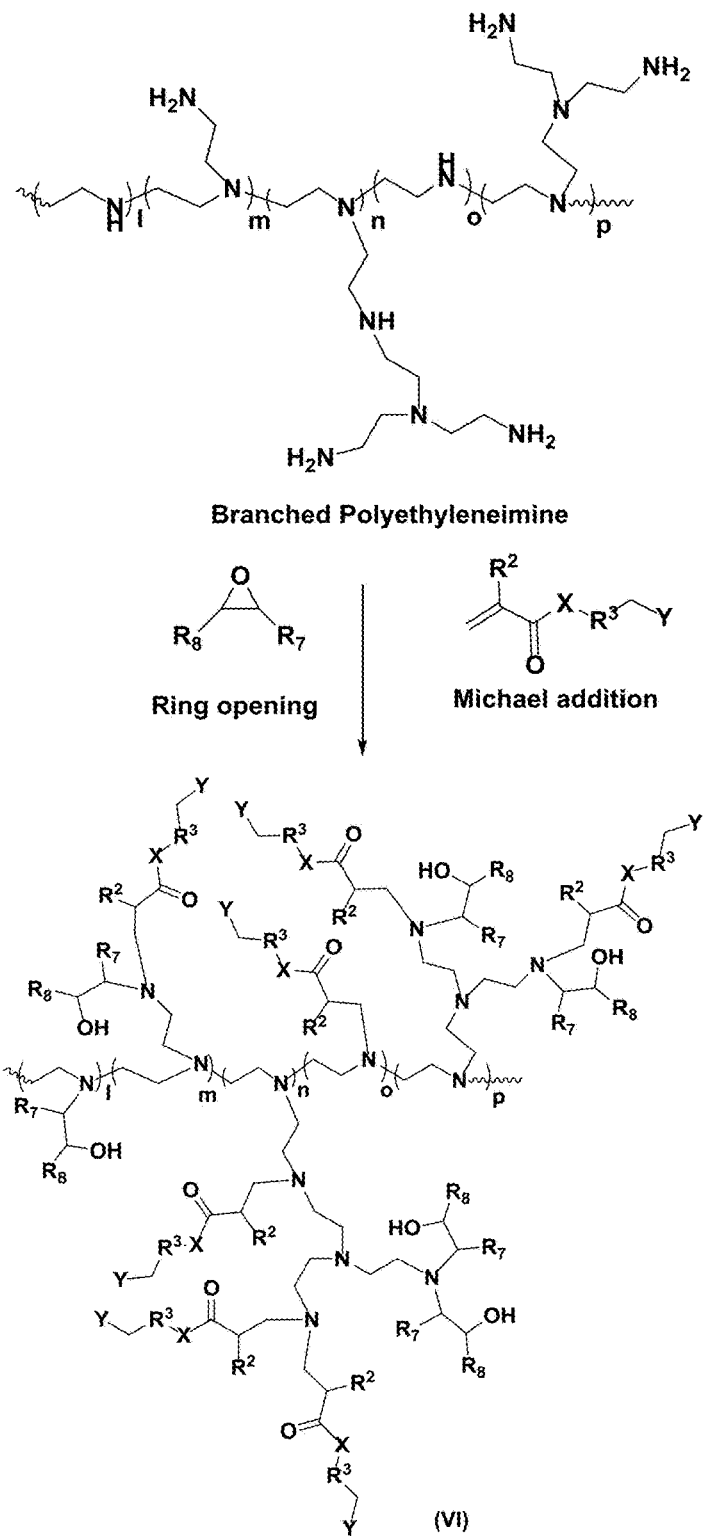
FIG. 3 shows an exemplary generic reaction scheme to produce a multiple charged cationic compound by reacting a branched polyethyleneimine with both an epoxide and α, β-unsaturated carbonyl compound through a ring-opening reaction and aza-Michael addition reaction, respectively.

The two reactions of a polyamine leading to some of the disclosed compound can be sequential or simultaneous, e.g., in three different ways as shown in FIG. 1, FIG. 2, and FIG. 3, which illustrates the generic schemes for the structures of and the reactions leading to the disclosed multiple charged cationic compounds. Some of the disclosed compounds that contain only nonionic group from epoxides can be obtained from the ring opening reaction between a polyamine and epoxide as shown in FIG. 1, FIG. 2, and FIG. 3.

FIG. 1 shows an exemplary generic reaction scheme to produce a multiple charged cationic compound first by a ring-opening reaction between a liner polyethyleneimine and epoxide and then an aza-Michael addition reaction with an activated olefin, e.g., an α,β-unsaturated carbonyl compound having a cationic group. FIG. 2 shows an exemplary alternate generic reaction scheme to produce a multiple charged cationic compound first by an aza-Michael addition reaction between a linear polyethyleneimine and α, β-unsaturated carbonyl compound and then a ring-opening reaction with an epoxide. FIG. 3 shows an exemplary generic reaction scheme to produce a multiple charged cationic compound by reacting a branched polyethyleneimine with both an epoxide and α, β-unsaturated carbonyl compound through a ring-opening reaction and aza-Michael addition reaction, respectively.

In FIG. 1, FIG. 2, and FIG. 3, k, l, m, n, o, or p is an integer of 1-100; X is NH or O; $R^2$ is H, $CH_3$, or an unsubstituted, linear or branched $C_2$-$C_{10}$ alkyl group; $R^3$ is absent or an unsubstituted, linear or branched $C_1$-$C_{30}$ alkylene group; Y is —$NR^4R^5R^{6(+)}$ or a salt thereof; $R^4$, $R^5$, and $R^6$ are independently $C_1$-$C_{10}$ alkyl group or benzyl group; $R^7$ is H or alkyl; and $R^8$ is alkyl, or —$(CH_2)_k$—O-alkyl, wherein k is an integer of 1-30.

The structures V and VI in FIG. 1, FIG. 2, and FIG. 3 are depiction of generalized reaction products. In structures V and VI, all the secondary and primary amine groups in the polyethyleneimine react with epoxides and α,β-unsaturated carbonyl compounds so that no secondary amine groups remain. It is possible that in the disclosed multiple charged ionic compounds, some secondary or primary amine groups do not react completely with either the epoxide or activated olefin and remain as primary or secondary amine groups in the multiple charged ionic compound or its salt.

In some embodiments, $R^7$ is H. In some other embodiments, $R^7$ is $CH_3$. In yet some other embodiments, $R^7$ is a $C_2$-$C_4$ alkyl.

In some embodiments; $R^8$ is a $C_1$-$C_{30}$ alkyl. In some other embodiments, $R^8$ is $C_8$-$C_4$ alkyl. In yet some other embodiments, $R^8$ is a $C_8$-$C_{20}$ alkyl.

In some embodiments, $R^8$ is —$(CH_2)_k$—O-alkyl, wherein k is an integer of 1-30 and the alkyl group is $C_1$-$C_{30}$ alkyl group.

In some embodiments, the polyamine is $NH_2$—$[R^{10'}]_n$—$NH_2$, $(RNH)_n$—$RNH_2$, $H_2N$—$(RNH)_n$—$RNH_2$, or $H_2N$—$(RN(R'))_n$—$RNH_2$, wherein $R^{10'}$ is a linear or branched, unsubstituted or substituted $C_2$-$C_{10}$ alkylene group, or combination thereof; R is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkylene group, or combination thereof; R' is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkyl group, $RNH_2$, $RNHRNH_2$, or $RN(RNH_2)_2$; and n can be from 2 to 1,000,000. The monomer in a polyamine, e.g., the R or R' group, can be the same or different. In this disclosure, a polyamine refers to both small molecule polyamine when n is from 1 to 9 and polymeric polyamine when n is from 10 to 1,000,000.

In other words, the multiple charged ionic compound can have a formula of $NA_2$-$[R^{10'}]_n$-$NA_2$, $(RNA)_n$-$RNA_2$, $NA_2$-$(RNA)_n$-$RNA_2$, or $NA_2$-$(RN(R'))_n$-$RNA_2$, or the like, wherein $R^{10'}$ is a linear or branched, unsubstituted or substituted $C_4$-$C_{10}$ alkylene group; R is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkylene group, or combination thereof; R' is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkyl group, $RNA_2$, $RNARNA_2$, or $RN(RNA_2)_2$; n can be from 2 to 1,000,000; A is a proton,

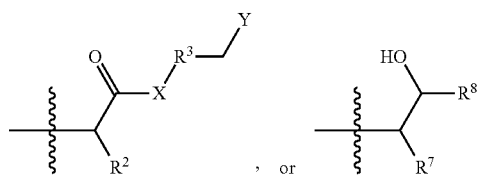

or a proton or

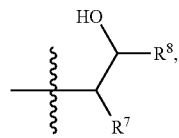

wherein X is NH or O; $R^2$ is H, $CH_3$, or an unsubstituted, linear or branched $C_2$-$C_{10}$ alkyl, alkenyl, or alkynyl group; $R^3$ is absent or an unsubstituted, linear or branched $C_1$-$C_{30}$ alkylene group; Y is —$NR_4R_5R_6^{(+)}$; $R^4$, $R^5$, and $R^6$ are independently a $C_1$-$C_{10}$ alkyl group; $R^7$ is H or alkyl; and $R^8$ is alkyl, or —$(CH_2)_k$—O-alkyl, wherein k is an integer of 1-30; wherein the compound is a multiple charged cationic compound having 1, 2, 3, or more positive charges from the activated olefin and at least one nonionic group from the epoxide or having at least one nonionic group from the epoxide.

In some embodiments, wherein the compound is a multiple charged cationic compound having 1, 2, 3, or more positive charges from the activated olefin and at least one nonionic group from the epoxide, derived from a polyamine's reactions with both an activated olefin and epoxide. In some other embodiments, the compound is a multiple charged cationic compound having at least one nonionic group, derived from a polyamine's reaction with an epoxide alone.

In some embodiments, A is a proton or nonionic

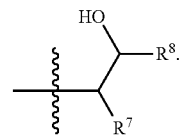

In some other embodiments, A is a proton, positively charged

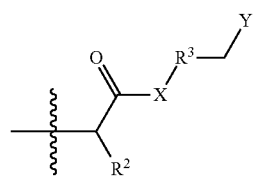

or nonionic

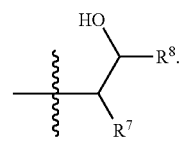

In some embodiments, at least two of the primary $NH_2$ protons were replaced by

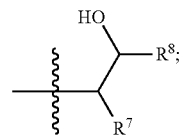

and the rest of primary $NH_2$ protons remains. In some other embodiments, all of the primary $NH_2$ protons are replaced by

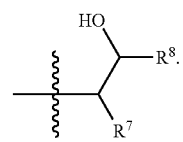

In some embodiments, some of primary NH$_2$ and secondary NH proton are replaced by

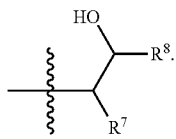

In some embodiments, all primary NH$_2$ and some of secondary NH proton are replaced by

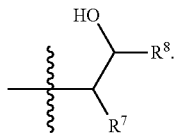

In some embodiments, at least two of the primary NH$_2$ protons were replaced by

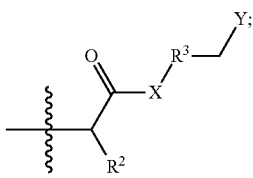

at least one of the primary NH$_2$ or secondary NH were replaced by

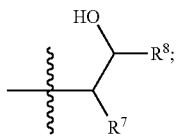

and the rest of primary NH$_2$ protons remains. In some other embodiments, all of the primary NH$_2$ protons are replaced by

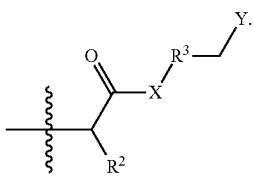

In some embodiments, some of primary NH$_2$ and secondary NH proton are replaced by

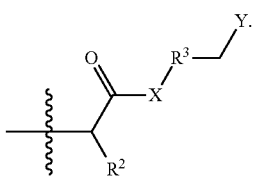

In some embodiments, all primary NH$_2$ and some of secondary NH proton are replaced by

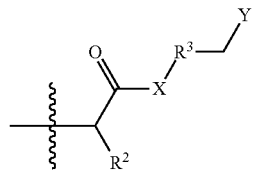

Nevertheless, the compounds disclosed herein are multiple charged cationic compounds having 1, 2, 3, or more

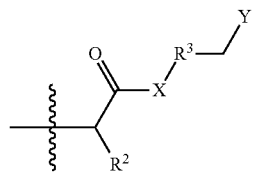

groups and at least one

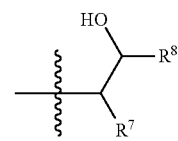

group or having at least one

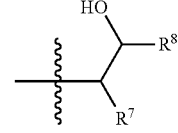

group.

In some embodiments, R$^2$ is H. In some embodiments, R$^2$ is CH$_3$. In yet some other embodiments, R$^2$ is CH$_3$CH$_3$, CH$_2$CH$_2$CH$_3$, or CH(CH$_3$)$_2$.

In some embodiments, Y is —NR$_4$R$_5$R$_6^{(+)}$. In some other embodiments, Y is —NR$_4$R$_5$R$_6^{(+)}$, and R$^4$, R$^5$, and R$^6$ are independently CH$_3$. In yet some other embodiments, Y is —NR$_4$R$_5$R$_6^{(+)}$, and R$^4$ and R$^5$, independently CH$_3$, and R$^6$ is a C$_6$-C$_{12}$ aromatic alkyl. In some other embodiments, Y is —NR$_4$R$_5$R$_6^{(+)}$, and R$^4$ and R$^5$, independently CH$_3$, and R$^6$ is —CH$_2$-C$_6$H$_6$.

In some embodiments, Y is —NR$_4$R$_5$R$_6^{(+)}$ and the counter ion for Y any negative charged ion or species. In some other embodiments, the counter ion for Y is selected from the group consisting of chloride, bromide, fluoride, iodide, acetate, aluminate, cyanate, cyanide, dihydrogen phosphate, dihydrogen phosphite, formate, carbonate, hydrogen carbonate, hydrogen oxalate, hydrogen sulfate, hydroxide, nitrate, nitrite, thiocyanate, and a combination thereof.

In some embodiments, R$^3$ is CH$_2$. In some other embodiments, R$^3$ is CH$_2$CH$_2$. In other embodiments, R$^3$ is C(CH$_3$)$_2$. In yet some other embodiments, R$^3$ is an unsubstituted, linear, and saturated C$_1$-C$_{30}$ alkylene group. In some embodiments, R$^3$ is an unsubstituted, linear, and unsaturated C$_1$-C$_{30}$ alkylene group.

In some embodiments, $R^3$ is a linear $C_8$-$C_{18}$ alkyl, alkenyl, or alkynyl group. In some other embodiments, $R^3$ is a branched $C_8$-$C_{20}$ alkyl, alkenyl, or alkynyl group.

In some embodiments, the polyamine is a linear, branched, or dendrimer polyamine with a general formula of —[RNH]$_n$—, wherein R is —CH$_2$CH$_2$—, —CH$_2$CH$_2$CH$_2$—, —CH(CH$_3$)CH$_2$—, a linear or branched, unsubstituted or substituted $C_4$-$C_{10}$ alkylene group, or combination thereof and n is an integer of 3, 4, 5, 6, 7-9, or from 10 to 1,000,000.

In some embodiments, the polyamine is a linear, branched, or dendrimer polyamine with a general formula of (RNH)$_n$—RNH$_2$, wherein R is —CH$_2$—, —CH$_2$CH$_2$—, —CH$_2$CH$_2$CH$_2$—, —CH(CH$_3$)CH$_2$—, a linear or branched, unsubstituted or substituted $C_4$-$C_{10}$ alkylene group, or combination thereof and n can be from 2 to 1,000,000. In some embodiments, R is the same in each monomer. In some other embodiments, R can be different from one monomer to another monomer.

In some other embodiments, the polyamine is a linear, branched, or dendrimer polyamine with a general formula of H$_2$N—(RNH)$_n$—RNH$_2$, wherein R is —CH$_2$—, —CH$_2$CH$_2$—, —CH$_2$CH$_2$CH$_2$—, —CH(CH$_3$)CH$_2$—, a linear or branched, unsubstituted or substituted $C_4$-$C_{10}$ alkylene group, or combination thereof and n can be from 2 to 1,000,000. In some embodiments, R is the same in each monomer. In some other embodiments, R can be different from one monomer to another monomer.

In yet some other embodiments, the polyamine is a linear, branched, or dendrimer polyamine with a general formula of H$_2$N—(RN(R'))$_n$—RNH$_2$, wherein R is —CH$_2$—, —CH$_2$CH$_2$—, —CH$_2$CH$_2$CH$_2$—, —CH(CH$_3$)CH$_2$—, a linear or branched, unsubstituted or substituted $C_4$-$C_{10}$ alkylene group, or combination thereof; R' is —CH$_2$—, —CH$_2$CH$_2$—, —CH$_2$CH$_2$CH$_2$—, —CH(CH$_3$)CH$_2$—, a linear or branched, unsubstituted or substituted $C_4$-$C_{10}$ alkyl group, RNH$_2$, RNHRNH$_2$, or RN(RNH$_2$)$_2$; and n can be from 2 to 1,000,000. In some embodiments, R or R' is the same in each monomer. In some other embodiments, R or R' can be different from one monomer to another monomer.

In some embodiments, the polyamine is one with a general formula of NH$_2$—[R$^{10'}$]$_n$—NH$_2$, wherein R$^{10'}$ is a linear or branched, unsubstituted or substituted $C_4$-$C_{10}$ alkylene group, or combination thereof and n is an integer of 3, 4, 5, 6, 7-9, or 10 to 1,000,000.

In some embodiments, the polyamine is one or more of polyamines under JEFFAMINE® by Huntsman.

In some embodiments, the polyamine comprises an alkyleneamine, the alkyleneamine comprising ethylenediamine, diethylenetriamine, triethylenetetramine, tetraethylenepentamine, pentaethylenehexamine, hexaethyleneheptamine, polyethyleneimine, tris(2-aminoethyl)amine, or a mixture thereof.

In some other embodiments, the polyamine is a mixture of monoamine, diamine, and triamine with a polyether backbone or with a polyether backbone based on propylene oxide (PO), ethylene oxide (EO), or a mixture of both oxides In some embodiments, the polyamine is an unmodified polyamine. In some other embodiments, the polyamine is a modified polyamine.

In yet some embodiments, the polyamine is an ethoxylated polyamine, propylated polyamine, polyamine with polyquat, polyamine with polyglycerol, or combination thereof.

In yet some other embodiments, the polyamine is a linear, branched, or dendrimer polyethyleneimine. In some other embodiments, the polyamine comprises only primary and secondary amine groups. In some embodiments, the polyamine comprises only primary, secondary, and tertiary amine groups. In some other embodiments, the polyamine comprises only primary and tertiary amine groups.

In some embodiments, the polyamine is a single compound. In some other embodiments, the polyamine is a mixture of two or more different polyamines, wherein the different polyamines have different molecular weight, different structure, or both.

In some embodiments, the polyamine has an average molecular weight ($M_w$) of from about 60 to about 2,000,000 Da. In some other embodiments, the polyamine has an average molecular weight ($M_w$) of from about 60 to about 5,000 Da. In yet some other embodiments, the polyamine has an average molecular weight ($M_w$) of from about 60 to about 25,000 Da.

In some embodiments, the polyamine has an average molecular weight ($M_w$) of about 60-200, about 100-400, about 100-600, about 600-5,000, about 600-800, about 800-2,000, about 800-5,000, about 100-2,000,000, about 100-25,000, about 600-25,000, about 800-25,000, about 600-750,000, about 800-750,000, about 25,000-750,000, about 750,000-2,000,000, about 100, about 200, about 300, about 400, about 500, about 600, about 700, about 800, about 1,000, about 1,500, about 2,000, about 3,000, about 5,000, about 8,000, about 10,000, about 15,000, about 20,000, about 50,000, about 100,000, about 250,000, about 500,000, about 1,000,000, about 2,000,000, or any value there between.

In some embodiments, the polyamine is diamine or triamine having an average molecular weight ($M_w$) of from about 130 to about 4,000.

In some embodiments, the compound is a mixture derived from a linear polyethyleneimine and (3-Acrylamidopropyl)trimethylammonium chloride (APTAC). In some other embodiments, the compound is a mixture derived from a linear polyethyleneimine and [3-(Methacryloylamino)propyl]trimethylammonium chloride (MAPTAC).

In some other embodiments, the multiple charged cationic compound is a mixture derived from a branched polyethyleneimine and 3-Acrylamidopropyl)trimethylammonium chloride (APTAC). In some other embodiments, the compound is a mixture derived from a linear polyethyleneimine and [3-(Methacryloylamino)propyl]trimethylammonium chloride (MAPTAC).

In some embodiments, the activated olefin is (3-Acrylamidopropyl)trimethylammonium chloride (APTAC), [3-(Methacryloylamino)propyl]trimethylammonium chloride (MAPTAC), 2-(acryloyloxy)-N,N,N-trimethylethanaminium chloride (DMAEA-MCQ), N,N-dimethylaminoethyl acrylate benzyl chloride quaternary salt (DMAEA-BCQ), or 2-(methacryloyloxy)-N,N,N-trimethylethan-1-aminium methyl sulfate (DMAEA-MSQ).

In some other embodiments, the activated olefin is (3-Acrylamidopropyl)trimethylammonium chloride (APTAC), [3-(Methacryloylamino)propyl]trimethylammonium chloride (MAPTAC), or mixture thereof.

In some other embodiments, the activated olefin is 2-(acryloyloxy)-N,N,N-trimethylethanaminium chloride (DMAEA-MCQ), N,N-dimethylaminoethyl acrylate benzyl chloride quaternary salt (DMAEA-BCQ), 2-(methacryloyloxy)-N,N,N-trimethylethan-1-aminium methyl sulfate (DMAEA-MSQ), or a mixture thereof.

In some embodiments, the epoxide is an alkylglycidyl ether, hexylglycidal ether, octylglycidal ether, dodecyglycidal ether, a 1,2-epoxyalkane, 1,2-epoxytetradecane, 1,2-epoxydodecane, or 1,2-epoxyoctane, or mixture thereof. In some other embodiments, the epoxide is an alkylglycidyl ether or 1,2-epoxyalkane. In yet some other embodiments, the epoxide is hexylglycidal ether, octylglycidal ether, dodecyglycidal ether, or mixture thereof. In some other embodiments, the epoxide is 1,2-epoxytetradecane, 1,2-epoxydodecane, or 1,2-epoxyoctane, or mixture thereof.

In some embodiments, the compound is a product from an epoxide, (3-Acrylamidopropyl) trimethylammonium chloride (APTAC) and a polyethylenimine with an average molecular weight ($M_w$) of about 1,300, a polyethylenimine with an average molecular weight ($M_w$) of about 5,000, a polyethylenimine with an average molecular weight ($M_w$) of about 25,000, or a polyethylenimine with an average molecular weight ($M_w$) of about 750,000, respectively.

It should be understood that when n is greater than 2, the compound can be a mixture of more than two cationic compounds, which differ from each other by the exact locations of NH replacements.

In some embodiments, the multiple charged cationic compound has an average molecular weight ($M_w$) of from about 100 to about 2,000,000 Da. In some other embodiments, the multiple charged cationic compound has an average molecular weight ($M_w$) of from about 100 to about 50,000 Da. In yet some other embodiments, the multiple charged cationic compound has an average molecular weight ($M_w$) of from about 100 Da to about 600 Da, from about 100 Da to about 1,000 Da, from about 100 Da to about 1,400 Da, from about 100 Da to about 3,000 Da, from about 100 Da to about 5,500 Da, or from about 100 Da to about 10,000 Da, from about 100 Da to about 20,000 Da, from about 100 Da to about 30,000 Da, or from about 100 Da to about 40,000 Da.

In some embodiments, the multiple charged cationic compound has at least 2, at least 3, at least 4, at least 5, at least 6, at least 7, at least 8, at least 9, or at least 10 positive charges. In some other embodiments, the compound has from 10 to 1,000 positive charges, or any value there between positive charges.

In some embodiments, the compound or the modified compound is soluble or dispersible in water.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions of the present disclosure may comprise, consist essentially of, or consist of the components and ingredients of the disclosed compositions or methods as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

EXAMPLES

Embodiments of the present disclosure are further defined in the following non-limiting Examples. These Examples, while indicating certain embodiments of the disclosure, are given by way of illustration only. From the above discussion and these Examples, one skilled in the art can ascertain the essential characteristics of this disclosure, and without departing from the spirit and scope thereof, can make various changes and modifications of the embodiments of the disclosure to adapt it to various usages and conditions. Thus, various modifications of the embodiments of the disclosure, in addition to those shown and described herein, will be apparent to those skilled in the art from the foregoing description. Such modifications are also intended to fall within the scope of the appended claims.

Example 1

General Scheme to Synthesize Exemplary Compounds

Figure 4:
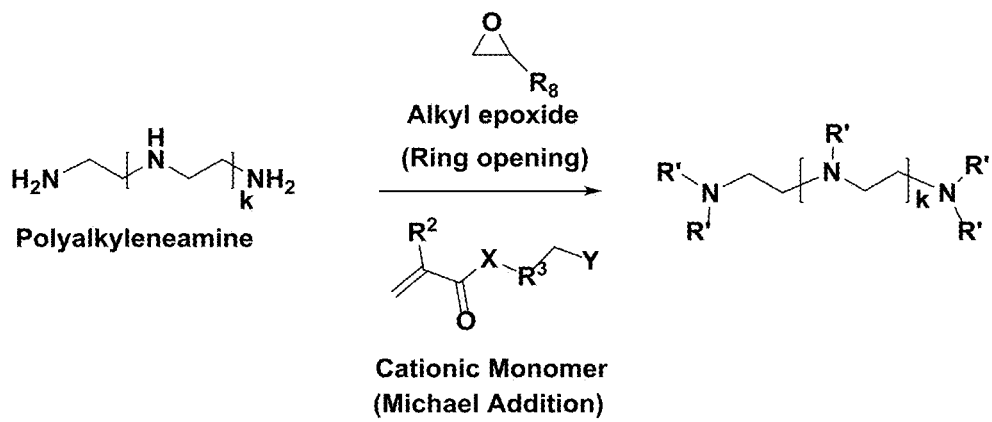
FIG. 4 shows a generic reaction scheme to produce a multiple charged cationic compound by reacting a linear polyethyleneimine with both an epoxide and α, β-unsaturated carbonyl compound through a ring-opening reaction and aza-Michael addition reaction, respectively.
Figure 4:
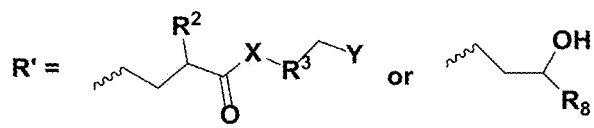

A generic synthesis reaction scheme for preparation of some of the multiple charged cationic compounds disclosed herein is FIG. 4. In this generic scheme, a linear polyethyleneimine is used as a representative for polyamines. Hydrogens on the nitrogen of the linear polyethyleneimine are replaced by both the cationic groups via aza Michael addition reactions and the hydrophobic groups via epoxide ring-opening reaction. Different compositions can be created by varying amounts of the ionic monomers and hydrophobic alkyl epoxide.

In FIG. 4, k is a integer of 1-100; X is NH or O; $R^2$ is H, $CH_3$, or an unsubstituted, linear or branched $C_2$-$C_{10}$ alkyl group; $R^3$ is absent or an unsubstituted, linear or branched $C_1$-$C_{30}$ alkylene group; Y is —$NR^4R^5R^{6(+)}$ or a salt thereof; $R^4$, $R^5$, and $R^6$ are independently $C_1$-$C_{10}$ alkyl group or benzyl group; and $R^8$ is alkyl, or —$(CH_2)_k$—O-alkyl, wherein k is an integer of 1-30.

Some of the multiple charged cationic compounds disclosed herein can be prepared by reacting a polyamine with one or more epoxides via epoxide ring-opening reaction alone. For these types of cationic compounds, the multiple cationic charges are resulted from protonation of backbone nitrogen atoms at lower pH.

The progression of the reactions can be monitored by ESI-MS and/or NMR spectroscopy for consumption of the cationic monomer and epoxide. The reactions can be stopped at time when about >98% for the monomer and epoxide is consumed. The aqueous or alcoholic solution of the multiple charged cationic compounds can be used "as-is" for the application testing.

In the scheme described above, water and/or isopropanol can be used as solvent. However, the use of solvent and/or diluent for the reaction is optional. When employed, a wide range of non-acidic solvents are suitable, such as, for example, acetonitrile, ethers (e.g., tetrahydrofuran (THF)), other alcohols (e.g., methanol, ethanol, n-butanol, glycol, PEG, or a mixture) and the like.

In the scheme described above, no additional catalyst is necessary. Because the reactions to synthesize the disclosed multiple charged cationic compounds uses a polyamine, the polyamine itself can function as a (base) catalyst for both reactions. However, an additional catalyst is optional. Aza-Michael addition and ring-opening reactions employed for synthesis of the disclosed multiple charged cationic compounds can also be catalyzed by a strong acid or base.

In the scheme described above, the reactions can be carried at a temperature of from about 50° C. to about 130° C. However, the reaction temperature can range from about 20° C. to about 150° C., more preferably from about 50° C. to about 100° C.

In the scheme described above, synthesis is achieved in a two-step reaction. However, the disclosed multiple charged cationic compounds can be synthesized by one-step, one-pot reaction by tandem Michael addition and ring-opening reaction by reacting a polyamine simultaneously with the ionic monomers and epoxide.

Example 2

Effect of Some Exemplary Multiple Charged Cationic Compounds for Corrosion Control Some exemplary multiple charged cationic compounds were tested for their efficacy to reduce corrosion or for corrosion control in a water system. The key structural features of each tested compound are listed in Table 2.

TABLE 2

Multiple Charged Cationic Compounds Tested for Corrosion Control

| ID | Polyamine | Activated Olefin | Epoxide | Ratio |
|---|---|---|---|---|
| 1 | Triethylene-pentamine | 3-acrylamidopropyl) trimethylammonium chloride | C12—C14 alkylglycidyl ether | 1:2.5:3 |
| 2 | Triethylene-pentamine | 3-acrylamidopropyl) trimethylammonium chloride | C12—C14 alkylglycidyl ether | 1:2:3 |
| 3 | Ethylene-amine E-100 | acrylamidopropyl) trimethylammonium chloride | C12—C14 alkylgly cidyl ether | 1:2.5:3 |
| 4 | Ethylene-amine E-100 | acrylamidopropyl) trimethylammonium chloride | C12—C14 alkylgly cidyl ether | 1:2.5:2 |
| 5 | Triethylene-pentamine | — | C12—C14 alkylgly cidyl ether | 1:1 |
| 6 | Triethylene-pentamine | — | C12—C14 alkylgly cidyl ether | 1:3 |

Synthesis of the Multi-Cationic Surfactant Compound 1

To a 250 mL three necked round-bottom flask equipped with temperature probe, condenser and magnetic stir bar was added ERISYS™ GE 8 (C12-C14 alkylglycidyl ether, CAS no: 68609-97-2, 132 grams, 0.470 mol). Triethylenepentamine (TEPA, 98%, 30 grams, 0.157 mol) was then added to the well-stirred reaction mixture. Temperature of the reaction was increased to 130° C. and stirred for 3h or until completion of reaction. The formed product is TEPA/C12-C14 alkylglycidyl ether (1:3) adduct.

To a 250 mL three necked round-bottom flask equipped with temperature probe, condenser and magnetic stir bar were added TEPA/C12-C14 alkylglycidyl ether (1:3) adduct (35.6 grams, 0.035 mol) and isopropanol (36 grams). (3-acrylamidopropyl)trimethylammonium chloride (APTAC, 75%, 24 grams, 0.087 mol) was then added into the flask. The resulting mixture was stirred at 70° C. overnight or until complete consumption of APTAC was achieved. As the reaction proceeded to completion suspension turned into a clear dark-amber solution.

Synthesis of the Multi-Cationic Surfactant Compound 2

To a 250 mL three necked round-bottom flask equipped with temperature probe, condenser and magnetic stir bar was added ERISYS™ GE 8 (C12-C14 alkylglycidyl ether, CAS no: 68609-97-2, 120 grams, 0.42 mol). Triethylenepentamine (TEPA, 98%, 40 grams, 0.21 mol) was then added to the well-stirred reaction mixture. Temperature of the reaction was increased to 130° C. and stirred for 3h or until completion of reaction. The formed product is TEPA/C12-C14 alkylglycidyl ether (1:2) adduct.

To a 250 mL three necked round-bottom flask equipped with temperature probe, condenser and magnetic stir bar were added TEPA/C12-C14 alkylglycidyl ether (1:2) adduct (33.62 grams, 0.044 mol) and isopropanol (50 grams). (3-acrylamidopropyl)trimethylammonium chloride (APTAC, 75%, 31 grams, 0.112 mol) was then added into the flask. The resulting mixture was stirred at 70° C. overnight or until complete consumption of APTAC was achieved. As the reaction proceeded to completion suspension turned into a clear dark-amber solution.

Synthesis of the Multi-Cationic Surfactant Compound 3

Synthesis of Ethyleneamine E-100/APTAC (1:2.5) Adduct

To a 250 mL three necked round-bottom flask equipped with temperature probe, condenser and magnetic stir bar were added Ethyleneamine E-100 (50 grams, 0.18 mole), (3-acrylamidopropyl)trimethylammonium chloride (APTAC, 75%, 121 grams, 0.44 mol) and water (20 grams) were added into the flask. The resulting mixture was stirred at 80° C. overnight to form an ethyleneamine E-100/APTAC (1:2.5) adduct. As the reaction proceeded to completion, mixture turned into a clear yellowish solution.

To a 250 mL three necked round-bottom flask equipped with temperature probe, condenser and magnetic stir bar was added the ethyleneamine E-100/APTAC 1:2.5 adduct (74%, 50 grams, 0.047 mol). ERISYS™ GE 8 (C12-C14 alkylglycidyl ether, CAS no: 68609-97-2, 41.5 grams, 0.148 mol) and isopropanol (40 grams) were then added into the flask. The resulting mixture was stirred at 90° C. overnight or until completion of reaction.

Synthesis of the Multi-Cationic Surfactant Compound 4

To a 250 mL three necked round-bottom flask equipped with temperature probe, condenser and magnetic stir bar was added the ethyleneamine E-100/APTAC 1:2.5 adduct (74%, 63 grams, 0.060 mol). ERISYS™ GE 8 (C12-C14 alkylglycidyl ether, CAS no: 68609-97-2, 34.2 grams, 0.122 mol) and isopropanol (40 grams) were then added into the flask. The resulting mixture was stirred at 90° C. overnight or until completion of reaction. The compounds 5 and 6 are the products from the reaction of the triethylenepentamine and an epoxide. Post ring-opening reaction acidification is done with either acetic acid or methanesulfonic acid. Different compounds can be generated by varying amount of the polyamine and hydrophobic alkyl epoxide.

The control chemistry used for comparison was an imidazoline made from the reaction of tall oil fatty acid (TOFA) with diethylene triamine (DETA) and further salted with acetic acid. This chemistry is known to be often used as oilfield corrosion inhibitors.

The efficacy for corrosion control is often measured by corrosion bubble cell tests. The bubble cell test simulates low flow areas where little or no mixing of water and oil occurs. The test was conducted using brine (80% of the brine having 3% sodium chloride and 20% of the brine being a hydrocarbon containing 100% LVT-200 kerosene oil). The brine was placed into kettles and purged with carbon dioxide. The brine was continually purged with carbon dioxide to saturate the brine prior to starting the test. After the test began, the test cell was blanketed with carbon dioxide one hour prior to electrode insertion and through the duration of the test to maintain saturation. The kettles were stirred at 150 revolutions per minute (rpm) for the duration of the test to maintain thermal equilibrium at 80° C. The corrosion rate was measured by Linear Polarization Resistance (LPR) techniques. The working electrode used was carbon steel. The counter and reference electrodes were both Hastelloy. The electrodes were all cleaned and polished prior to testing.

Data were collected for three hours before about 4 ppm of each of the tested and control compositions was dosed into its respective cell. Each tested or control composition comprises 10 wt-% of the tested or control compound and 1 wt-% of 2-mercaptoethanol (2ME) as synergist in an organic solvent. The actual concentration of the tested or control compound in each cell was 4 ppm and one of 2ME was 0.4 ppm. Data were collected overnight.

Figure 5:
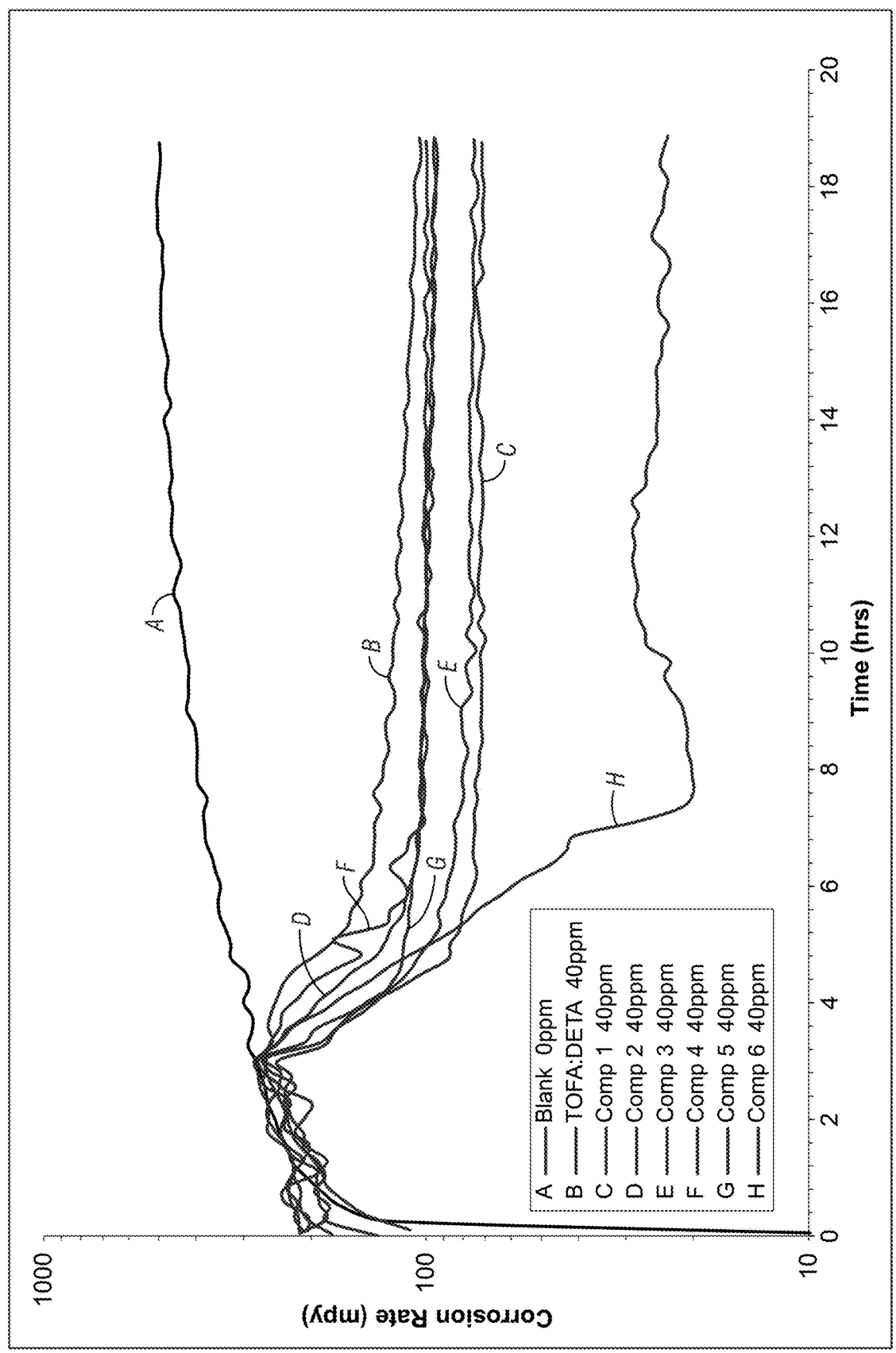
FIG. 5 shows corrosion rate in mils per year (mpy) during the bubble test period (18 hour). For the blank sample, no 2-mercaptoethanol (2ME) was added.

The results of the bubble cell test are shown in FIG. 5 and Table 3, wherein ppm is parts per million, CI is corrosion inhibitor, and mpy is mils per year. 0.4 ppm of 2-mercaptoethanol (2ME) were present with each multiple charged cationic compound or control. FIG. 5 shows the corrosion rate in mils per year during the bubble test period (18 hour). For the blank sample, no 2-mercaptoethanol (2ME) was added.

TABLE 3

Corrosion rate at 15th Hour after each multiple charged cationic or control compound in bubble test results

| Multiple charged cationic or Control Cationic Compound | Dosage of APG or Compound (ppm) | Inhibited Corrosion Rate 15 h After APG or Control Addition (mpy) | % Protection |
|---|---|---|---|
| Blank | 0 | 500 | N/A |
| TOFA:DETA imidazoline salted with acetic acid (Control) | 4 | 107 | 79 |
| 1 | 4 | 71 | 86 |
| 2 | 4 | 100 | 80 |
| 3 | 4 | 75 | 85 |
| 4 | 4 | 95 | 81 |
| 5 | 4 | 95 | 81 |
| 6 | 4 | 24 | 95 |

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

The disclosure being thus described, it will be obvious that the same may be varied in many ways. Such variations are not to be regarded as a departure from the spirit and scope of the disclosure and all such modifications are intended to be included within the scope of the following claims.

What is claimed is:

1. A method of controlling corrosion on a surface in a water system comprising:
providing a corrosion control composition or a use solution of the corrosion control composition into a water system to generate a treated water system or onto a metal surface of the water system to reduce corrosion on the metal surface,
wherein the corrosion control composition comprises one or more multiple charged cationic compound(s);
wherein the multiple charged cationic compound(s) is derived from a polyamine through a reaction between the polyamine and an epoxide, or between the polyamine, an activated olefin and an epoxide;

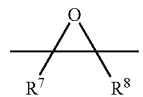

wherein the polyamine and activated olefin undergo aza Michael Addition reaction and the polyamine and epoxide undergo ring opening reaction;
wherein the multiple charge cationic compound(s) have the generic formula of $NA_2\text{-}[R^{10'}]_n\text{-}NA_2$, $(RNA)_n\text{-}RNA_2$, $NA_2\text{-}(RNA)_n\text{-}RNA_2$, or $NA_2\text{-}(RN(R'))_n\text{-}RNA_2$, wherein:

$R^{10'}$ is a linear or branched, unsubstituted or substituted $C_4\text{-}C_{10}$ alkylene group, or combination thereof;

R' is $-CH_2-$, $-CH_2CH_2-$, $-CH_2CH_2CH_2-$, $-CH(CH_3)CH_2-$, a linear or branched, unsubstituted or substituted $C_4\text{-}C_{10}$ alkylene group, or combination thereof;

R' is $-CH_2-$, $-CH_2CH_2-$, $-CH_2CH_2CH_2-$, $-CH(CH_3)CH_2-$, a linear or branched, unsubstituted or substituted $C_4\text{-}C_{10}$ alkyl group, $RNA_2$, $RNARNA_2$, or $RN(RNA_2)_2$; n can be from 2 to 1,000,000;

A is a proton,

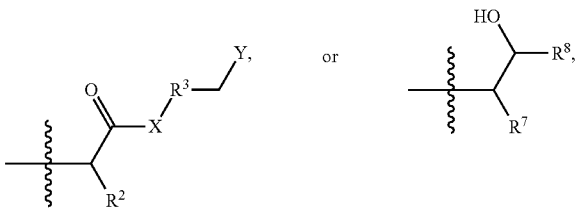

or

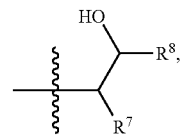

X is NH or O;

$R^2$ is H, $CH_3$, or an unsubstituted, linear or branched $C_2\text{-}C_{10}$ alkyl, alkenyl, or alkynyl group;

$R^3$ is absent or an unsubstituted, linear or branched $C_1\text{-}C_{30}$ alkylene group;

Y is $-NR^4R^5R^{6(+)}$; $R^4$, $R^5$, and $R^6$ are independently a $C_1\text{-}C_{10}$ alkyl group;

$R^7$ is H or alkyl; and $R^8$ is alkyl, or $-(CH_2)_k-O\text{-alkyl}$, wherein k is an integer of 1-30;

wherein the compound(s) has 1, 2, 3, or more

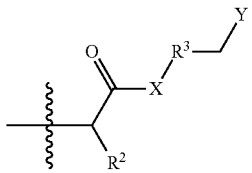

groups and at least one

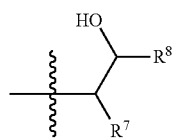

group, or having at least one

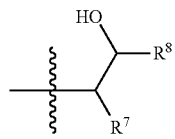

group and a
protonated polyamine.

2. The method according to claim 1, wherein the polyamine is a (i) linear, branched, or dendrimer polyamine with a general formula of -[RNH]$_n$-, where in R is —CH$_2$—, —CH$_2$CH$_2$—, —CH$_2$CH$_2$CH$_2$—, —CH(CH$_3$)CH$_2$—, a linear or branched, unsubstituted or substituted C$_2$-C$_{10}$ alkylene group, or combination thereof and n is an integer of 2, 3, 4, 5, 6, 7, 8, 9, or 10 to 1,000,000, (ii) linear polyamine with a general formula of H$_2$N-(RNH)$_n$-RNH$_2$, where in R is —CH$_2$—, —CH$_2$CH$_2$—, —CH$_2$CH$_2$CH$_2$—, —CH(CH$_3$)CH$_2$—, a linear or branched, unsubstituted or substituted C$_2$-C$_{10}$ alkylene group, or combination thereof and n is an integer of 2, 3, 4, 5, 6, 7, 8, 9, or 10 to 1,000,000, or (iii) linear polyamine with a general formula of H$_2$N-(RN(R'))$_n$-RNH$_2$, where in R is —CH$_2$—, —CH$_2$CH$_2$—, —CH$_2$CH$_2$CH$_2$—, —CH(CH$_3$)CH$_2$—, a linear or branched, unsubstituted or substituted C$_2$-C$_{10}$ alkylene group, or combination thereof, R' is —CH$_2$—, —CH$_2$CH$_2$—, —CH$_2$CH$_2$CH$_2$—, —CH(CH$_3$)CH$_2$—, a linear or branched, unsubstituted or substituted C$_2$-C$_{10}$ alkyl group, RNH$_2$, RNHRNH$_2$, or RN(RNH$_2$)$_2$ and n is an integer of 2, 3, 4, 5, 6, 7, 8, 9, or 10 to 1,000,000.

3. The method according to claim 1, wherein the polyamine is a polyalkyleneimine and wherein the polyalkyleneimine is ethyleneimine; propyleneimine; butyleneimine; pentyleneimine; hexyleneimine; heptyleneimine, or a combination thereof.

4. The method according to claim 1, wherein the polyamine comprises an alkyleneamine, the alkyleneamine is ethylenediamine, diethylenetriamine, triethylenetetramine, tetraethylenepentamine, pentaethylenehexamine, hexaethyleneheptamine, polyethyleneimine, tris(2-aminoethyl)amine, or a combination thereof.

5. The method according to claim 1, wherein the polyamine is a mixture of a monoamine, diamine, and triamine with a polyether backbone or with a polyether backbone based on propylene oxide (PO), ethylene oxide (EO), or a mixture of both oxides.

6. The method according to claim 1, wherein the polyamine is a linear, branched, or dendrimer polyethyleneimine.

7. The method according to claim 1, wherein the polyamine comprises only (i) primary and secondary amine groups, (ii) primary, secondary, and tertiary amine groups, or (iii) primary and tertiary amine groups.

8. The method according to claim 1, wherein the polyamine is a (i) single compound, or (ii) mixture of two or more different polyamines, wherein the different polyamines have different molecular weight, different structure, or both.

9. The method according to claim 1, wherein the polyamine has an average molecular weight of from about 60 to about 2,000,000 Da, or from about 60 to about 25,000 Da.

10. The method according to claim 1, wherein the epoxide is an alkylglycidyl ether, butylglycidal ether, hexylglycidal ether, octylglycidal ether, dodecyglycidal ether, tetradecylglycidal ether, a 1,2-epoxyalkane, 1,2-epoxytetradecane, 1,2-epoxydodecane, or 1,2-epoxyoctane.

11. The method according to claim 1, wherein the compound(s) is derived from a polyamine reacted with an activated olefin and an epoxide, and wherein the activated olefin is (3-Acrylamidopropyl)trimethylammonium chloride (APTAC), [3-(Methacryloylamino)propyl]trimethylammonium chloride (MAPTAC), 2-(acryloyloxy)-N,N,N-trimethylethanaminium chloride (DMAEA-MCQ), N,N-dimethylaminoethyl acrylate benzyl chloride quaternary salt (DMAEA-BCQ), or 2-(methacryloyloxy)-N,N,N-trimethylethan-l-aminium methyl sulfate (DMAEA-MSQ).

12. The method according to claim 1, wherein the compound(s) is (i) a mixture of at least two multiple charged cationic compounds derived from the same polyamine, activated olefin, and epoxide, or (ii) a mixture of at least two multiple charged cationic compounds derived from different polyamines and the same activated olefin and epoxide.

13. The method according to claim 1, wherein the compound(s) has an average molecular weight of from about 100 to about 2,000,000 Da, or from about 100 to about 5,500 Da or from about 100 to about 200,000, and wherein the compound has at least (i) 10, 15, 20, or 30 positive (or cationic) charges, or (ii) 2, 3, 4, 5, 6, 7, 8, or 9 positive charges.

14. The method according to claim 1, wherein the compound(s) is derived from (i) a linear polyethyleneimine and 2-acrylamido-2-methyl-1-propanesulfonic acid and C12-C14 alkylglycidyl ether, (ii) a branched polyethyleneimine and 2-ethylhexylglycidal ether and 3-acrylamidopropyl) trimethylammonium chloride (APTAC).

15. The method according to claim 1, wherein the compound(s) is soluble or dispersible in water or the corrosion control composition.

16. The method according to claim 1, wherein the corrosion control composition or the use solution of the corrosion control composition further comprises an additional corrosion inhibitor, an organic solvent, an asphaltene inhibitor, a paraffin inhibitor, an antifoulant, a scale inhibitor, an emulsifier, a water clarifier, a dispersant, an emulsion breaker, a reverse emulsion breaker, a gas hydrate inhibitor, a hydrogen sulfide scavenger, a biocide, a preservative, a pH modifier, a surfactant, a synergist, or a combination thereof.

17. The method according to claim 1, wherein the corrosion control composition comprises a carrier, and wherein the carrier is water, an organic solvent, or a mixture thereof.

18. The method according to claim 1, wherein the corrosion control composition is a liquid, gel, or a mixture comprising liquid/gel and solid.

19. The method according to claim 1, wherein the corrosion control composition or a use solution thereof has a pH of from about 2 to about 11.

20. The method according to claim 1, wherein the corrosion control composition comprises from about 20 wt-% to about 60 wt-% of the multiple charged cationic compound or mixture thereof.

21. The method according to claim 1, wherein the multiple charged cationic compound(s) or mixture thereof has a concentration of from about 0.1 ppm to about 1000 ppm in the treated water system.

22. The method according to claim 1, wherein the multiple charged cationic compound(s) or mixture thereof is provided to the water system independently, simultaneously, or sequentially with one or more additional corrosion control composition agents, and wherein the water system comprises fresh water, recycled water, salt water, surface water, produced water, or mixture thereof.

23. The method according to claim 1, wherein the water system is a cooling water system, boiler water system, petroleum wells, downhole formations, geothermal wells, mineral washing, flotation and benefaction, papermaking, gas scrubbers, air washers, continuous casting processes in the metallurgical industry, air conditioning and refrigeration, water reclamation, water purification, membrane filtration, food processing, clarifiers, municipal sewage treatment, municipal water treatment, or potable water system.

24. The method according to claim 1, wherein the water system is a surface that can be exposed to any water moisture.

* * * * *

UNITED STATES PATENT AND TRADEMARK OFFICE
CERTIFICATE OF CORRECTION

PATENT NO. : 11,359,291 B2
APPLICATION NO. : 16/554972
DATED : June 14, 2022
INVENTOR(S) : Ashish Dhawan et al.

It is certified that error appears in the above-identified patent and that said Letters Patent is hereby corrected as shown below:

In the Claims

Column 46, Claim 1, Lines 8-13:
DELETE " 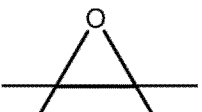 "

Column 46, Claim 1, Line 25:
DELETE "R'"
INSERT --R--

Column 48, Claim 13, Line 44:
DELETE "compound"
INSERT --compound(s)--

Column 48, Claim 14, Lines 49-50:
DELETE "C12-C14"
INSERT --$C_{12}$-$C_{14}$--

Column 48, Claim 14, Line 51:
DELETE "3-acrylamidopropyl)"
INSERT --(3-acrylamidopropyl)--

Signed and Sealed this
Sixth Day of December, 2022

Katherine Kelly Vidal
*Director of the United States Patent and Trademark Office*